US011743304B2

(12) United States Patent
Asveren et al.

(10) Patent No.: US 11,743,304 B2
(45) Date of Patent: Aug. 29, 2023

(54) METHODS AND APPARATUS TO PRESERVE ORIGINAL ATTESTATION/SIGNATURE INFORMATION FOR DIVERTED CALLS

(71) Applicant: Ribbon Communications Operating Company, Inc., Westford, MA (US)

(72) Inventors: Tolga Asveren, Bordentown, NJ (US); Pradeep Bala, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 314 days.

(21) Appl. No.: 17/134,325

(22) Filed: Dec. 26, 2020

(65) Prior Publication Data

US 2021/0203700 A1    Jul. 1, 2021

(30) Foreign Application Priority Data

Dec. 27, 2019 (IN) .............................. 201941054108

(51) Int. Cl.
*H04L 65/1104* (2022.01)
*H04L 65/1069* (2022.01)
(Continued)

(52) U.S. Cl.
CPC ...... *H04L 65/1104* (2022.05); *H04L 61/5007* (2022.05); *H04L 65/1016* (2013.01); *H04L 65/1069* (2013.01)

(58) Field of Classification Search
CPC ............. H04L 65/1104; H04L 61/5007; H04L 65/1016; H04L 65/1069
See application file for complete search history.

(56) References Cited

U.S. PATENT DOCUMENTS

2003/0046404 A1* 3/2003 O'Neill ................. H04L 67/563
709/228
2007/0121622 A1* 5/2007 Zhu ...................... H04L 65/1016
370/389

(Continued)

OTHER PUBLICATIONS

Rosenberg et al., Request for Comments (RFC) 3261 entitled "SIP: Session Initiation Protocol", Internet Engineering Task Force, Jun. 2002, 269 pages.

(Continued)

*Primary Examiner* — Khaled M Kassim
(74) *Attorney, Agent, or Firm* — Straub & Straub; Stephen T. Straub; Michael P. Straub

(57) ABSTRACT

Communications methods and apparatus for preserving STIR/SHAKEN original attestation/signature information for diverted Session Initiation Protocol (SIP) messages and/or calls. An exemplary method embodiment includes the steps of: receiving, at a first Session Border Controller (SBC), a diverted Session Initiation Protocol (SIP) INVITE message corresponding to a first call, the diverted SIP INVITE message not including an Identity header; obtaining an original Identity header or information from the original Identity header corresponding to the first call using one or more of the following: information included in the diverted SIP INVITE message, information included in a Session Description Protocol message included in the diverted SIP INVITE message, an SBC trunk group, or a source Internet Protocol (IP) address transport protocol port of an IP packet carrying the diverted SIP Invite message; and generating an Identity header based on the original Identity header or information from the original identity header.

27 Claims, 11 Drawing Sheets

(51) Int. Cl.
   *H04L 65/1016* (2022.01)
   *H04L 61/5007* (2022.01)

(56) References Cited

U.S. PATENT DOCUMENTS

| | | | | |
|---|---|---|---|---|
| 2009/0016339 | A1* | 1/2009 | Tanizawa | H04M 3/54 |
| | | | | 370/389 |
| 2009/0041018 | A1* | 2/2009 | Bakker | H04M 3/54 |
| | | | | 370/392 |
| 2012/0016996 | A1* | 1/2012 | Samavedam | H04L 65/1104 |
| | | | | 709/227 |
| 2014/0106723 | A1* | 4/2014 | Britstein | H04L 65/1069 |
| | | | | 455/417 |
| 2014/0237127 | A1* | 8/2014 | Vass | H04M 15/41 |
| | | | | 709/227 |
| 2016/0261740 | A1* | 9/2016 | Lacroix | H04L 65/1104 |
| 2016/0309036 | A1* | 10/2016 | Li | H04L 65/1096 |
| 2017/0170926 | A1* | 6/2017 | Laabs | H04L 1/0076 |
| 2022/0078216 | A1* | 3/2022 | Khoury | H04L 65/1069 |

OTHER PUBLICATIONS

Handley et al., Request for Comments (RFC) 4566 entitled "SDP: Session Description Protocol", Internet Engineering Task Force, Jul. 2006, 49 pages.

Wendt et al., Request for Comments (RFC) 8588 entitled " Personal Assertion Token (PaSSporT) Extension for Signature-based Handling of Asserted information using toKENs (SHAKEN)", Internet Engineering Task Force, May 2019, 9 pages.

* cited by examiner

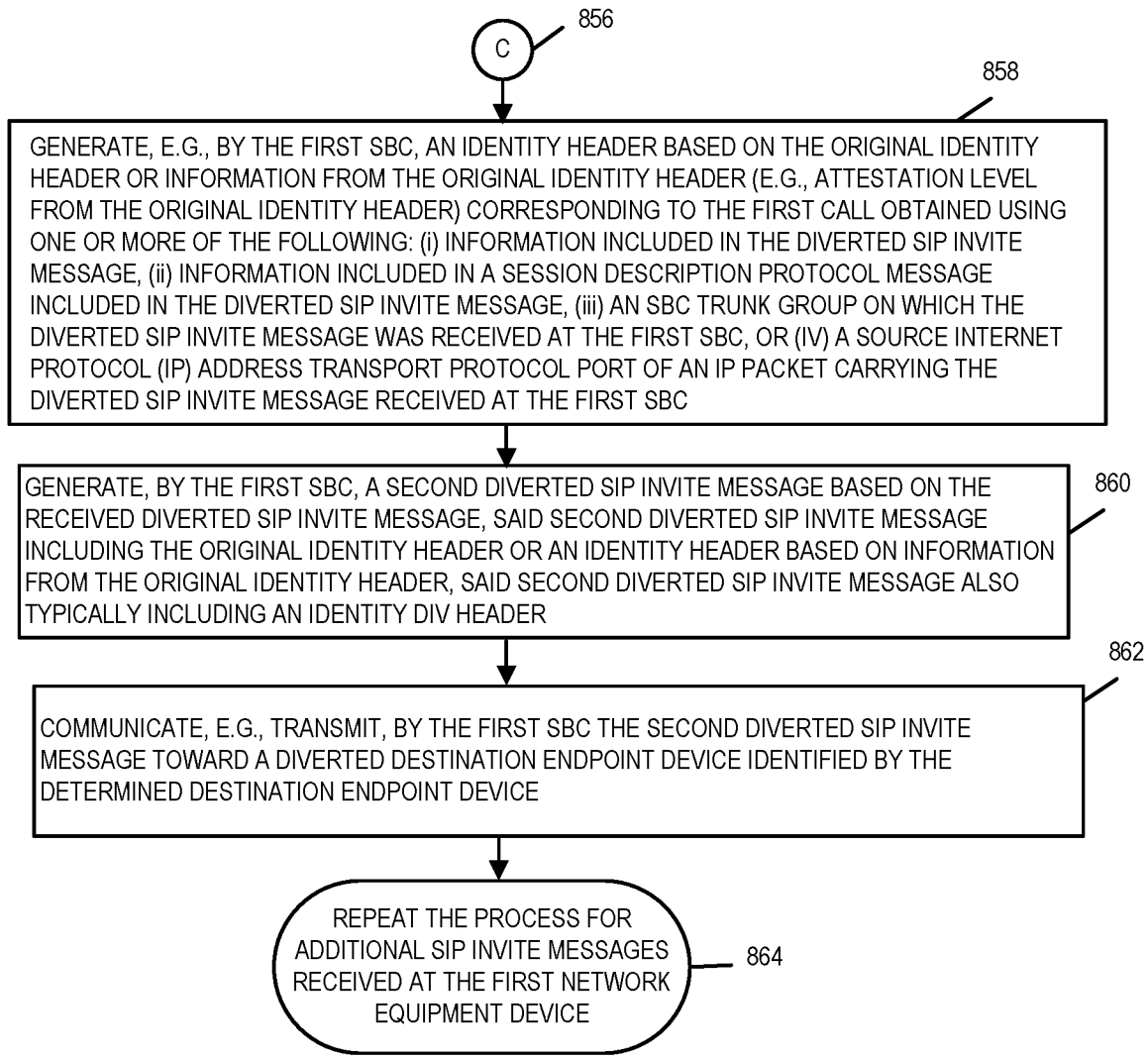

US 11,743,304 B2

METHODS AND APPARATUS TO PRESERVE ORIGINAL ATTESTATION/SIGNATURE INFORMATION FOR DIVERTED CALLS

RELATED APPLICATION

The present application claims the benefit of Indian Provisional Patent Application Serial Number: 201941054108 which was filed on Dec. 27, 2019 and which is hereby expressly incorporated by reference in its entirety.

FIELD OF INVENTION

The present invention relates to systems, apparatus and methods for preserving original attestation/signature information for diverted Session Initiation Protocol (SIP) messages and/or calls.

BACKGROUND OF THE INVENTION

Providing secure/high fidelity calling party information is important for various services, e.g., voice calls. This information may be, and sometimes is, used by end user devices and/or end users to accept/reject calls, by core network elements/devices to classify a session or call as a robocall or for further analysis to determine robocall determination criteria. STIR (which stands for Secure Telephone Identity Revisited) and SHAKEN (which stands for Secure Handling of Asserted information using toKENs) are telecommunications industry standards designed to enable service providers to cryptographically sign calls in the Session Initiation Protocol (SIP) header. STIR/SHAKEN provides a way for the calling party information to be securely transferred through several hops (network equipment devices, e.g., routers). This is achieved by using a SIP Identity header with a shaken claim set. The claim set includes calling/called party information and is accompanied by a signature generated by the service operator which has authenticated the calling party. An Identity (shaken) header is valid for a calling party/called party pair and any change in the respective SIP header fields, e.g., From, To, Request-URI header fields would cause the signature verification to fail.

Call diversion is a common scenario in communication networks where the called party forwards the call to another party. This results in information in the SIP INVITE Request-URI header field to be changed but the information in the To/From header fields stay intact, that is the To and From headers are not changed. There is a need to provide fidelity for this operation as well and that is provided with Identity (div). A div claim includes information about this diversion process by including original calling/called party information as well as the new target. Verification is performed on an Identity (shaken) and one or more Identity (div) headers to make sure that the claims add up to a complete chain from original calling/called party to the final target. There could be multiple Identity (div) headers if the call is diverted several times.

During the diversion process, the role of Identity (shaken) as the starting anchor is critical. The Identity header is usually not provided to end point devices, e.g., phones, enterprise IP-PBXs, tablets, computers, mobile devices, etc., and it is more likely than not that the Identity header won't be reflected back for the diverted call. This causes operators, e.g., service operators, of the diverting entity, e.g., network equipment devices, to fabricate or generate an Identity (shaken) with a low attestation value even if the original Identity (shaken) value was at the highest attestation level. The attestation level provides the degree of fidelity or trustworthiness. This corresponds to the [1], [4], [5] path shown in diagram 100 of FIG. 1 for the diverted SIP INVITE message. Obviously, this is not an ideal situation as the original attestation level is lost.

In FIG. 1, SP-a refers to the Service Provider A, SP-b refers to Service Provider B and SP-c 104 refers to Service Provider C. SPc-104 includes retargeting In-Network Application Server 108, Retargeting End User Device 1 110, Retargeting End-User Device 2 112, STI-AS (STI-authentication server) 114. In FIG. 1, TN refers to telephone number with TN-a being the telephone number corresponding to an endpoint device from which the SIP INVITE message originated, TN-b refers to the telephone number for the endpoint device to which the SIP INVITE message was sent, and TN-c refers to the telephone number for the endpoint device to which the SIP INVITE message was diverted. In the [1], [4], [5] path of FIG. 1, at path point [1] the SIP INVITE TN-b message is received by an Session Border Controller (SBC) 1 located in the Service Provider B network from a network device in the Service Provider A network. The Request-URI content for the SIP INVITE request received at path point [1] is "TN-b". The To header content is "TN-b", the From header content is "TN-a" and the Identity header content is "shaken PASSporT{attest=full, orig/dest=a/b}". The Identity header content being generated and inserted into the message by a network equipment device located in the Service Provider A network after verification of SIP message originator or calling party information for example by comparing the From header information of the message to registration information maintained at the network equipment device when the user device which sent the SIP message registered for service.

In this example, the attestation level included in the SIP INVITE message that was received is full which is the highest level indicating that the calling party information can be trusted for use by the receiving network entity which in this case is SBC 1 located in Service Provider B network. In this example, the SBC 1 sends the SIP INVITE to an end-user device 2 112 which receives it at path point [4], e.g., an Internet Protocol Private Branch Exchange (IP-PBX). The end-user device 2 112 does not pass the SIP Identity header when diverting a SIP message, e.g., forwarding a SIP message to another end device. For example, the end-user device may not have the capability to forward SIP Identity headers. As a result, the SIP diverted message generated at path point 4 by the end user device 2 112 does not include an identity header. The diverted SIP Invite message at point [5] therefore includes "attest=Gateway" which is the lowest level as the originator of the message couldn't be verified as the original attestation information was lost when the SIP INVITE message was diverted.

From the foregoing it should be appreciated that there is a need for a technological solution to the technological problem of how to maintain or preserve the attestation level for diverted SIP messages and/or SIP calls when the STIR/SHAKEN protocols are implemented.

SUMMARY OF THE INVENTION

The present invention provides a technological solution of how to provide and/or preserved STIR/SHAKEN diversion information for diverted Session Initiation Protocol (SIP) messages and/or calls. Various embodiments of the present invention include novel methods and apparatus to solve one or more of the problems identified above.

An exemplary communications method in accordance with an embodiment of the present invention comprises the steps of: receiving, at a first Session Border Controller (SBC), a diverted Session Initiation Protocol (SIP) INVITE message corresponding to a first call, said diverted SIP INVITE message not including an Identity header; obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC; and generating an Identity header based on the original Identity header or information from the original identity header (e.g., attestation level) corresponding to the first call obtained using said one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC.

In some embodiments, the information included in the diverted SIP INVITE message includes information which identifies a record in which the original Identity header or said information from the original Identity header is stored.

In some embodiments, the record is a call context record including a copy of the original Identity header or said information from the original Identity header.

In some embodiments, the information from the original Identity header is an attestation level.

In some embodiments, the information which identifies a record in which the original Identity header or said information from the original Identity header is stored includes one or more of the following: (i) a record identifier and (ii) call identification information.

In some embodiments, the information which identifies a record in which the original Identity header or said information from the original Identity header is stored is a record identifier, said record identifier being encrypted and included in a proprietary header, proprietary parameter or proprietary tag of the diverted SIP INVITE message. In various embodiments, the record further includes one or more of the following: (i) a record identifier or (ii) call identification information that identifies the record as including information for the first call. In some such embodiments, the call identification information that identifies the record as including information for the first call includes one or more of the following: (i) an SBC trunk group identifier for an SBC trunk group at the first SBC, (ii) a source Internet Protocol (IP) address transport protocol port of the first SBC, and (iii) a SBC IP address and UDP port number of a second SBC.

In many, but not all embodiments, the method further comprises the steps of: receiving, at a second Session Border Controller, a SIP INVITE message corresponding to the first call including the original Identity header prior to receiving at the first SBC the diverted SIP INVITE message; storing, by the second Session Border Controller, the original Identity header or information from the original Identity header (e.g., attestation level) in a record (e.g., a call context record) at the second Session Border Controller, a separate storage device (e.g., shared database), or at both the second Session Border Controller and a separate storage device, said separate storage device being accessible to both the second Session Border Controller and the first Session Border Controller. In some such embodiments, the first session border controller and said second session border controller are different session border controllers while in other embodiments the first and second session border controllers may be, and in fact are, the same session border controller.

In some embodiments, the step of obtaining an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: the first SBC using information included in the diverted SIP INVITE message to obtain the original Identity header or information from the original Identity header, said information included in the diverted SIP INVITE message including: a record identifier included in a proprietary header, proprietary header parameter or proprietary header tag of the diverted SIP INVITE message. In some such embodiments, the record identifier is included in a proprietary parameter of a From header included in the diverted SIP INVITE message.

In various embodiments, the step of obtaining an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: the first SBC using information included in the diverted SIP INVITE message to retrieve the original Identity header or information from the original Identity header from a record stored in a storage device with the information included in the diverted SIP INVITE message including one or more of the following: the original identity header or an attestation level corresponding to the first call included in a proprietary header, a proprietary header parameter, or a proprietary header tag of the diverted SIP INVITE message.

In some embodiments, the original Identity header or the attestation level corresponding to the first call is included in a proprietary parameter of a From header included in the diverted SIP INVITE message. In some embodiments, the original Identity header or the attestation level corresponding to the first call is encrypted using a shared key known to the first Session Border Controller.

In some embodiments, the method further includes that prior to receiving the diverted SIP INVITE message at the first Session Border Controller performing the steps of: encrypting, at a second Session Border Controller, the original Identity header or the attestation level corresponding to the first call; and placing the encrypted original Identity header or the attestation level corresponding to the first call in a proprietary parameter of a From header of a SIP INVITE message which is communicated to an endpoint device (e.g., IP-PBX) from the second Session Border Controller.

In some embodiments, the call identification information includes one or more of the following: an SBC IP address and UDP port number for a media session for the first call with the SBC IP address and UDP port number for the media session for the first call also being included in a SDP body of the SDP message included in the diverted SIP INVITE message.

In various embodiments, the method includes the additional steps of: receiving, at a second Session Border Controller, a SIP INVITE message corresponding to the first call including the original Identity header prior to receiving at the first SBC the diverted SIP INVITE message; storing, by the second Session Border Controller, the original Identity header in a call context record at the second Session Border Controller; and communicating from said first Session Border Controller to said second Session Border Controller said diverted SIP INVITE message. In such embodiments, the first and the second Session Border Controllers are different Session Border Controllers. In some embodiments, the step of obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: the second Session Border Controller identifying said call context record in which the original Identity header is stored using one or more of: (i) said information included in the diverted SIP INVITE message, and (ii) said information included in a Session Description Protocol message included in the diverted SIP INVITE message. In some such embodiments, the step of generating an Identity header based on the original Identity header or information form the original Identity header corresponding to the first call is performed by the second Session Border Controller.

The present invention is also applicable to systems, devices and apparatus, for example, systems, devices, and apparatus which implement one or more steps of the invention described herein. The system(s), device(s), and apparatus may, and in some embodiments do, include one or more processors and a memory or storage device, the memory or storage device including instructions, e.g., software instructions, which when executed by the one or more processors control the system(s), device(s) or apparatus to perform one or more steps or operations of the methods described herein.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 8 shows the combination of FIGS. 8A, 8B, 8C and 8D.

FIG. 8D illustrates a fourth part of a flowchart of an exemplary method in accordance with an embodiment of the present invention.

DETAILED DESCRIPTION

Figure 1:
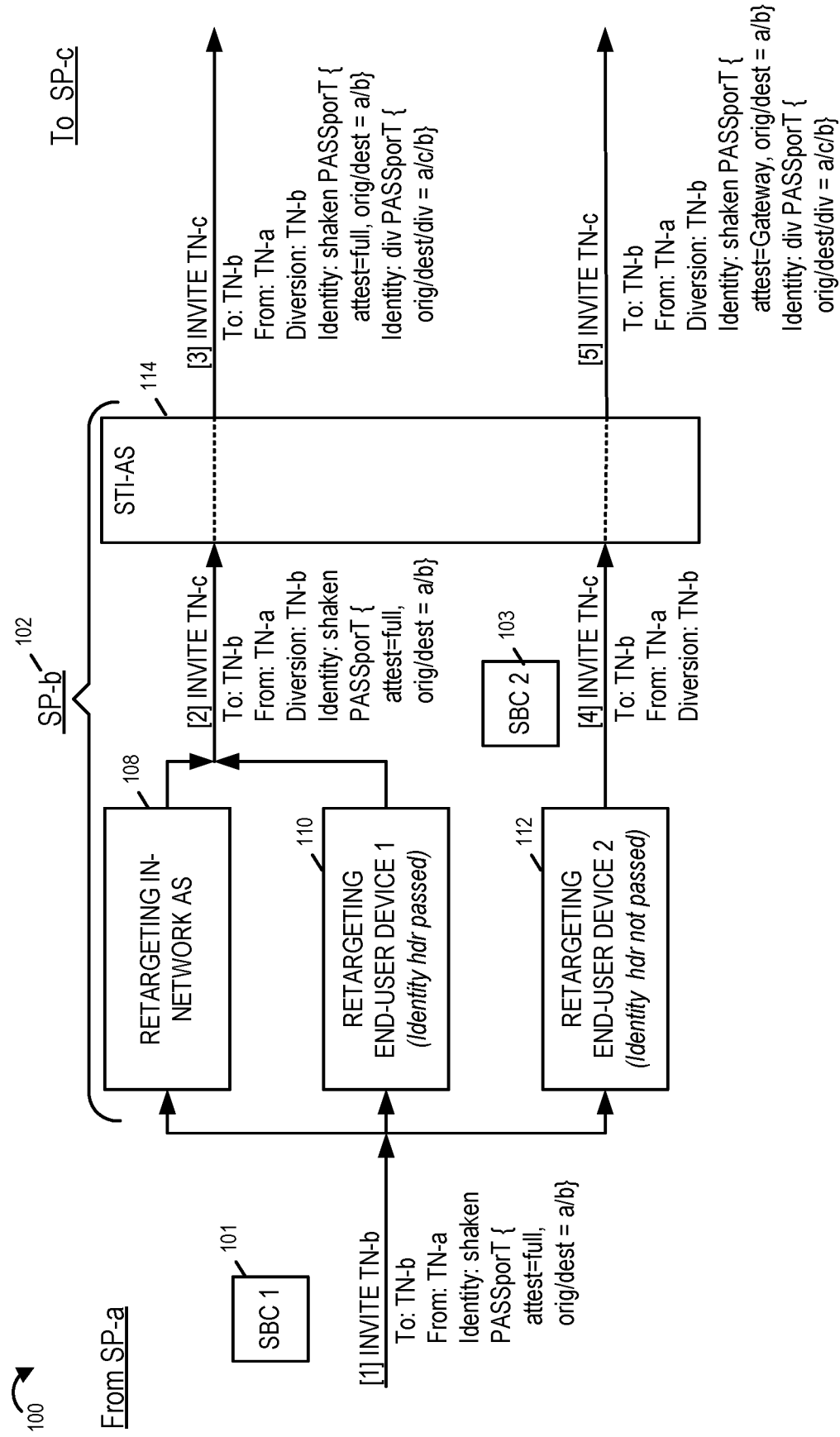
FIG. 1 illustrates a system in which a SIP INVITE message has been diverted.

The present invention relates to, among other things, systems, apparatus and methods for preserving original attestation/signature information of SIP messages or calls that are diverted when the STIR/SHAKEN protocols are being utilized. Various embodiments of the present invention address and solve one or more of the technological problems discussed above.

Request for Comments (RFC) 3621 entitled "SIP: Session Initiation Protocol" published in July 2002 by the IETF (Internet Engineering Task Force) is a specification that provides information that describes the Session Initiation Protocol. RFC 4566 entitled "SDP: Session Description Protocol" published in July 2006 by the IETF is a specification that provides information that describes the Session Description Protocol." RFC 8588 entitled, "Personal Assertion Token (PaSSporT) Extension for Signature-based Handling of Asserted information using toKENs (SHAKEN)" published in May 2019 by the IETF is a specification that describes the extension of "the Personal Assertion Token (PASSporT), which is a token object that conveys cryptographically signed information about the participants involved in communications. The extension is defined based on the "Signature-based Handling of Asserted information using toKENs (SHAKEN)" specification by the ATIS/SIP Forum IP-NNI Task Group. It provides both (1) a specific set of levels of confidence in the correctness of the originating identity of a call originated in a SIP-based telephone network as well as (2) an identifier that allows the Service Provider (SP) to uniquely identify the origin of the call within its network. Each of the aforementioned specifications are hereby incorporated by reference in their entirety.

As discussed above with respect to the Shaken/Stir protocols the originating operator or service provider authenticates or verifies the calling/called party. The originating operator or service provider equipment checks information in the received SIP INVITE request and verifies no spoofing is going on. However, the message or call can pass through different networks in the path to its destination. In Shaken/Stir, the originating operator uses its private key to sign a portion of the SIP information which includes the calling and called party and places this information in a SIP message Identity header. The terminating network equipment will identify calling and called party information in the SIP message and determine if the call signature in the Identity header matches. The terminating operator verifies the signature by using the public key of the originating operator. An attestation level corresponds to how certain the signature is valid or message is valid.

When a SIP message or call is diverted by an endpoint the Identity header and/or attestation level is typically not preserved as discussed above in various cases the end point devices either do not receive the Identity header or do not pass the Identity header.

Several different scenarios will now be discussed in connection with FIGS. 1 and 2 to preserve the original attestation/signature information in diverted SIP messages or calls.

A first Session Border Controller (SBC), SBC 1 101 in system 100 which is network equipment in the Service Provider-b network receives the first SIP INVITE message from a network equipment device in the Service Provider-a network. The first SIP INVITE message includes the following URI-header, To header, From header and Identity header respectively: TN-b, From: TN-a, Identity: shaken PASSporT {attest=full orig/dest=a/b}. The first SBC receives and processes the first SIP INVITE message. The first SBC knows that the destination identified in the To header TN-b is a trusted end point device, e.g., an IP-PBX, located in the Service Provider-b network or serviced by the Service Provider-b network that has the ability to reflect back parameters attached to at least one header, e.g., the FROM header in a diverted SIP INVITE message but does not pass Identity headers when diverting, e.g., forwarding, a received SIP INVITE message or call. The first SBC encrypts at least a portion of the Identity header information, e.g., the attestation level (attest=full), using a shared encryption key and then includes this encrypted portion of the Identity header information in a proprietary parameter of a SIP header of the SIP INVITE message that the first SBC knows will be reflected by the trusted end point device, e.g., the IP-PBX.

In this example, the encrypted portion of the Identity header information is included in a proprietary parameter of the FROM header. In most, but not all embodiments, the at least a portion of the Identity header information will actually be the entire Identity header. In cases where the length of the entire Identity header is problematic because it is too long then at least the attestation level from the Identity header will be encrypted and included in the proprietary parameter of the SIP header that is to be reflected back when a SIP message or call is diverted, e.g., forwarded to another destination.

The shared secret key that is used to encrypt the entire Identity header information or at least a portion of the Identity header information is a secret key that is shared among all of the SBCs in the Service Provider-b network or at a minimum all SBCs that provide service to the trusted end point device with address TN-b that may divert the SIP message to a new destination address. Alternatively, the Identity header or a portion of the Identity header can be sent as plain text but with a digital signature, e.g., cryptographic hash, to provide integrity instead of encrypting it. Any mechanism described henceforth which refers to encrypted header/parameter should be understood as equally applicable for the digital signature model as well.

Once the first SBC has generated a new SIP INVITE message which includes the FROM header with the proprietary parameter including the encrypted Identity header or at least a portion of the Identity header, the first SBC transmits the new SIP INVITE message to the end point device, e.g., an IP-PBX, with the destination address TN-b. The end point device with the destination address TN-b in this example diverts or forwards the received SIP INVITE message to an end point device having a destination address TN-c located in the Service Provider-c network.

The end point device with the destination address TN-b does not have the capability to pass Identity headers and the Identity header included in the SIP INVITE message is not included in the SIP INVITE diverted message transmitted to the end device with a destination address TN-c. However, the SIP INVITE diversion message generated by the end point device with the destination address TN-b does have the capability to reflect proprietary parameters included in the FROM header. In this example, the SIP INVITE message generated by the end device with the destination address TN-b includes the FROM header proprietary parameter including the encrypted Identity header or the encrypted portion of the Identity header included by the first SBC. The SIP INVITE message generated by the end point device with destination TN-b includes the following URI header, To header, From header and Diversion header respectively: TN-c, To: TN-b, From: TN-a; X-Identity-header=encrypted (Identity: shaken PASSporT {attest=full orig/dest=a/b}), Div: TN-b.

The X-Identity-header=encrypted(Identity: shaken PASSporT {attest=full orig/dest=a/b}) is the proprietary parameter including the encrypted Identity header. While X-Identity-header has been used for explanatory purposes the X-Identity-header proprietary parameter name will in most embodiments be a name from which the contents of the information will not be easily identifiable or associated with the Identity header, e.g., instead of X-Identity-header it could be X-history or X-device-history, so as to avoid attempts by malicious actors from obtaining or spoofing the Identity header or Identity header information included in the proprietary parameter.

The end point device with the destination address TN-b transmits the SIP INVITE diverted request it generated with the reflected From header including the proprietary parameter including the encrypted Identity header or Identity header information to a second Session Border Controller in the Service Provider-b network. The second Session Border Controller (SBC 2 103) being one of the Service Provider-b network SBCs providing service to the trusted end point device with the destination TN-b. The second Session Border Controller receives the diverted SIP INVITE request message from the trusted end point device with address TN-b and using the shared secret key decodes the encrypted Identity header or portion of the Identity header included in the proprietary header parameter of the FROM header of the diverted SIP INVITE request message, i.e., the reflected proprietary parameter of the FROM header. In the case where the entire entity header was encrypted and included in the proprietary FROM parameter the second SBC upon decrypting it uses it to construct a new Identity header for the received diverted SIP INVITE request message. The second SBC generates a new diverted SIP INVITE request message based on the diverted SIP INVITE request message received from the trusted end point device with address TN-b. The second SBC diverted SIP INVITE request message includes the following URI header, To header, From header and Diversion header respectively: TN-c, To:TN-b, From: TN-a, Diversion: TN-b, Identity: shaken PASSporT{attest=full orig/dest=a/b}, Identity: shaken PASSporT{attest=full orig/dest/div=a/c/b}.

The Identity header "Identity: shaken PASSporT{attest=full orig/dest=a/b}" being the original identity header obtained from the From header proprietary parameter. The Identity header "Identity: shaken PASSporT{attest=full orig/dest/div=a/c/b}" being an Identity header created by the second SBC for the diverted SIP INVITE message. It should also be understood that the second SBC has stripped or removed the proprietary parameter from the "From header" which included the encrypted Identity header.

The second SBC transmits the diverted SIP INVITE request message it generated based on the diverted SIP INVITE request message it received from the end point destination with address TN-b to the end point device with the address TN-c which is located in the Service Provider-c network.

Through this mechanism, the diverted SIP INVITE request or call will contain the original attestation/signature even though the SIP INVITE request or call has been diverted When the end point device with the address TN-c receives the diverted SIP INVITE request message from the second SBC, the diverted SIP INVITE request message will include the original attestation/signature information for use by the end point device with the address TN-c.

In some embodiments, the first SBC and the second SBC are the same SBC that is the trusted end point device with the address TN-b transmits the diverted SIP INVITE request message back to the first SBC. This may occur for example when the first SBC is one of a plurality of SBCs in the Service Provider-b network servicing the end point device with the address TN-b with respect to both incoming and outgoing SIP messages. In some embodiments, the first SBC may be the only SBC which is servicing the trusted end point device with the address TN-b and as a result all diverted SIP messages from the end point device with the address TN-b will be received by the first SBC.

In those cases wherein only a portion of the Identity header is included in the proprietary header parameter, for example the attestation level, the second SBC after decrypting the portion of the Identity header included in the proprietary header parameter, e.g., the attestation level, uses the decrypted information to construct a new Identity header.

For example when the entire Identity header's length is to long to include in the proprietary From header parameter then the first SBC can decode the pay load of the Identity header, encrypt the "Attestation level" extracted from the payload using the shared secret key and include the encrypted "Attestation level" in the proprietary From header parameter. The proprietary From head parameter will be sent back by the end point device which reflects the From header and the second SBC can then decrypt using the shared secret key the "Attestation level" and use the "Attestation level" to construct a new Identity header.

Shown below is an example of a From header with a proprietary parameter including the original "Attestation-Level":

Eg: From: Alice<sip:5616011001@vzims.com>; tag=1928301774;X-Attestation-Level=A
where the X-Attestation-Level=A is the FROM header proprietary parameter including the Attestation-Level=A from the Identity header which will have been encrypted using the shared secret key. As encrypted the "X-Attestation-Value=A" would be "X-Attestation-Value=5&83". When the digital signature variant is used instead of encryption for the same X-Attestation-Level=A; x-hash=9bcd (wherein the hash value is generated based on or using the original attestation level, original To header, and original From header). While for explanatory purposes the proprietary parameter's name has been shown as X-Attestation-Level, a name unassociated with Identity header information will be utilized so as to avoid attempts at obtaining and/or spoofing the Identity Header Attestation Level.

Communications system 200 illustrates an exemplary system in accordance with an embodiment of the present invention.

System 200 includes a first end point device 202, e.g., a user equipment device such as a IP phone, mobile phone, smartphone, cell phone, tablet, or computer, having a telephone number TN-a, a network equipment device 1 204, a plurality of Session Border Controllers (SBCs) 206, 208, . . . , 210, and an end point device 212, e.g., an IP PBX, with a telephone number TN-b, and endpoint device 214 with a telephone number TN-C, a plurality of communications links 216, 218, 220, 222, 224. The endpoint device 202 and network equipment device 204 are part of a Service Provider-a Network. The plurality of SBCs include SBC 1 206, SBC 2 208, . . . , SBC N 210, where N is an integer number greater than 2. The plurality of SBCs being part of a Service Provider-b Network. The endpoint device 212 is part of or serviced by the Service Provider-b Network. Communications network 250 is part of the Service Provider-b Network and network equipment device 1 204, endpoint device 212, and SBC 1, SBC 2, . . . , SBC N, storage device 205 and endpoint device 214 are all connected to the network 250 allowing these system elements to communicate with one another. In some embodiments the storage device 205 is a data base with a processor and memory which is used to store records with call identifying information and an Identity header from a call, e.g., a call context or session context record. Endpoint device 214 with telephone number TN-c is located in the Service Provider-c network.

The endpoint device 212 telephone number TN-b does not pass or forward SIP identity headers when it diverts, re-targets or forwards a SIP message, e.g., a SIP INVITE message. The endpoint device 212 is configured to divert or re-target SIP messages or calls directed to it to the endpoint device 214 with telephone number TN-c.

Another exemplary embodiment of the present invention will now be described that provides a way for preserving the original attestation level of a diverted or re-targeted call (e.g., diverted SIP INVITE request) when the first network element, e.g., SBC, serving the diverted call (e.g., diverted SIP INVITE request) may not be the same as the network element (e.g., SBC) serving the original call.

The exemplary embodiment makes use of information included in the Session Description Protocol Offer message included in the diverted SIP Invite message.

The Session Description Protocol is defined in the "SDP: Session Description Protocol IETF RFC 4566 dated July 2006. As the specification states on pages 7-8: "An SDP session description consists of a session-level section followed by zero or more media-level sections. The session-level part starts with a "v=" line and continues to the first media-level section. Each media-level section starts with an "m=" line and continues to the next media-level section or end of the whole session description. In general, session-level values are the default for all media unless overridden by an equivalent media-level value.

Some lines in each description are REQUIRED and some are OPTIONAL but all MUST appear in exactly the order given here (the fixed order greatly enhances error detection and allows for a simple parser). OPTIONAL items are marked with a "*".

Session Description
v=(protocol version)
o=(originator and session identifier)
s=(session name)
i=*(session information)
u=*(URI of description)
e=*(email address)
p=*(phone number)
c=*(connection information—not required if included in all media)
b=*(zero or more bandwidth information lines)
One or more time descriptions ("t=" and "r=" lines; see below)
z=*(time zone adjustments)
k=*(encryption key)
a=*(zero or more session attribute lines)
Zero or more media descriptions
Time Description
t=(time the session is active)
r=*(zero or more repeat times)
Media description, if present
m=(media name and transport address)
i=*(media title)
c=*(connection information—optional if included at session level)
b=*(zero or more bandwidth information lines)
k=*(encryption key)
a=*(zero or more media attribute lines)
(RFC 4566 pages 7-8)

The embodiment will now be explained in connection with FIG. 1. With respect to FIG. 1, the SP-b network equipment device facing the retargeting end-user device 2 112 (e.g., IP-PBX) uses a different port range for each of the following categories:

category 1: Original SIP INVITE request message received at the network equipment device at point [1] had no Identity header (e.g., network equipment device media ports 1 to 100);

category 2: Original SIP INVITE request message received at network equipment device at point [1] has Identity header with attestation level=full (e.g., network equipment device media ports 101 to 200);

category 3: Original SIP INVITE request message received at network equipment device at point [1] has Identity header with attestation level=partial (e.g., network equipment device media ports 201 to 300);

category 4: Original SIP INVITE request message received at network equipment device at point [1] has Identity header with attestation level=gateway (e.g., network equipment device media ports 301 to 400).

Each of the network equipment devices in the Service Provider-b network are configured to use the same range of media ports for each of these four categories. The media port being included by the network equipment device in the Session Description Protocol Offer message (media or m line) included in the SIP INVITE message that is sent to the endpoint device which is diverting or retargeting the call/SIP INVITE message.

In this way whenever a diverted SIP Invite message is received without an Identity header, the original attestation level can be determined for the call from the network equipment device media port identified in the Session Description Protocol Offer message of the diverted SIP Invite request.

For example, when a first network equipment device in the Service Provider-b at point 1, e.g., a first SBC (SBC 1 101), receives the original SIP invite request for the call, the network equipment device decodes the header Identity, determines the attestation level from the header Identity, and classifies the call or original SIP INVITE as belonging to one four categories based on the determined attestation level of the Identity header. In the example shown in FIG. 1, the original SIP INVITE request include attest=full which matches category 2. The first network equipment device then generates a SIP INVITE request based on the original SIP INVITE request received at point 1. The generated SIP INVITE request includes a Session Description Protocol offer message which includes the first network equipment device media port to be used to which media, e.g., audio, is to be sent for the call. This port number is included in the media line or m line of the SDP offer message. In this example, the media port is port number 150 which is a port number in the range of 101 to 200 (exemplary category 2 port ranges to be used by network equipment devices in the Service Provider-b network as discussed above). The network equipment device transmits the generated SIP INVITE request with SDP offer message to the end-user device 2 which does not pass the Identity header. The end-user device 2 generates and transmits a diverted or retargeted SIP INVITE message to a second network equipment device in the Service Provider-b network. This diverted SIP INVITE message includes a SDP offer message with the first network equipment device media port specified as port 150. The second network equipment device (SBC 2 103) receives the diverted or retargeted SIP INVITE message at point 4. The second network equipment device identifies the first network equipment device media port number as port 150 from the SDP offer message included in the received SIP INVITE message. The second network equipment device then generates a Identity(shaken) header based on media port information in received SIP INVITE SDP Offer message by determining which category 1, 2, 3, or 4 the media port number is included in. In this example, the second network equipment device identifies that the call corresponding to the SIP INVITE message received at point 4 belongs in category 2 as the port number is 150 which corresponds to the attestation level equals full for the original identity header. The second network equipment device then at point 5 generates the SIP INVITE message with the original identity header attestation value of full and sends it to the end point device at telephone number TN-c which is located in the Service Provider-c network. The method works to preserve the original attestation level whether or not the second network equipment device and the first network equipment device are the same device as both network equipment devices are using the same media port ranges for the Identity attestation level categories 1, 2, 3, and 4.

Another embodiment of preserving the original attestation/signature information for diverted or retargeted calls will now be discussed in connection with the system 200 illustrated in FIG. 2 and signaling diagram/method 300 illustrated in FIG. 3. While it is to be understood that additional signaling and steps are needed for establishing a call, the signaling diagram/method 300 illustrates the steps pertinent to explaining this embodiment of the invention. Elements or steps with the same reference numbers used in different figures are the same or similar and those elements or steps will not be described in detail again.

The method 300 begins in start step 302. Operation proceeds from step 302 to step 312. In step 312, SBC 1 receives SIP INVITE request message 310 from network equipment device 1 204 to initiate a call. The SIP INVITE request message 310 having been generated by the network equipment device 1 204 based on a SIP INVITE request message received from endpoint device 202 having telephone number TN-a. The network equipment device 1 204 verifying the endpoint device 202 with TN-a and generating the SIP identity header included in the SIP INVITE Request message 310. The SIP INVITE Request message 310 including the following: (i) Request URI header: "TN-b"; (ii) To header: "To: TN-b"; (iii) From header: "From: TN-a"; (iv) Identity header: "Identity: shaken PASSporT{attest=full orign/dest=a/b}; (v) a SDP Offer message. Operation proceeds from step 312 to step 314.

In step 314, the SBC 1 generates SIP INVITE request message 318 based on SIP INVITE request message 310. The SIP INVITE request message includes the following: (i) Request URI header: "TN-b", (ii) To header: "To: TN-b"; (iii) From header: "From: TN-a"; (iv) Identity header: "Identity: shaken PASSporT{attest=full orign/dest=a/b}; (v) a SDP Offer message which includes "c=SBC-1 IP-A, m=audio SBC-1 Port A"). The c line of the offer message either in the session description portion of the SDP Offer message or in the media description portion of the SDP Offer message. SBC-1 IP-A being the Internet Protocol Address for SBC 1 and SBC-1 Port A being the transport address also referred to herein as the port or port number. The SBC 1 Internet Protocol address and port defining the IP address and port to be used for communicating media to the SBC 1 from the destination device in connection with the call. Operation proceeds from step 314 to step 315.

In step 315, the SBC 1 206 generates a call context record for the call and stores the call context record in a storage device, e.g., in the memory of the SBC 1 206. The call context record includes the Identity header from the SIP INVITE request message along with information to identify the call. The SBC 1 IP address and port address from the media c and m lines in some embodiments are information used to identify the call and act as a key for indexing the stored call context records. In some embodiments, as discussed below the storage device, e.g., storage device 205, is a separate storage device such as a shared storage device accessible to all service provider-b network equipment that receive diverted SIP Invite messages, e.g., the plurality of SBCs in the network 250, for processing, e.g., forwarding to the diverted destination. Operation proceeds from step 315 to step 316.

In step 316, the SBC 1 206 transmits the SIP INVITE request message 318 to the endpoint device 212 which may be, and in some embodiments is, an IP-PBX which does not pass Identity headers. Operation proceeds from step 316 to step 320.

In step 320, the endpoint device 212 having telephone number TN-b has a call diverting or retargeting feature activated to divert calls to telephone number TN-b to telephone number TN-c. Call diverting or retargeting features include for example call forwarding and call transfer features. Operation proceeds from 320 to step 322.

In step 322, the endpoint device 212 generates the SIP INVITE request message 326 based on the SIP INVITE request message 318. The SIP INVITE request message 326 includes: (i) Request URI header: "TN-c"; (ii) To header: "To: TN-b"; (iii) From header: "From: TN-a"; (iv) Diversion header: "Diversion: TN-b"; (v) a SDP Offer message which includes "c=SBC-1 IP-A, m=audio SBC-1 Port A"). As the endpoint device 212 does not pass the Identity header there is no identity header in the SIP INVITE request message 326. Operation proceeds from step 322 to step 324.

In step 324, the endpoint device 212 transmits the SIP INVITE request message 326 to the SBC 2 208. The SIP INVITE request message 326 also referred to as the diverted SIP INVITE request message. SBC 1, SBC 2, . . . , SBC N all being SBCs in Service Provider-b network that provide services to endpoint device 212.

In step 328, the SBC 2 208 receives the diverted SIP INVITE request message 326. Operation proceeds to step 330.

In step 330, the SBC 2 208 determines that the diverted SIP INVITE request message 326 was diverted based on information contained in the SIP INVITE request, e.g., the URI header and the To header having different destination addresses or the diversion header. The SBC 2 208 also identifies that the diverted SIP INVITE request message 326 does not contain an Identity header. Upon determining that the SIP INVITE request message 326 is a diverted SIP INVITE request message (i.e., a diverted call) which does not have an Identity header, the SBC 2 208 determines from the information included in the SDP offer message of the SIP INVITE message 326 that the IP address SBC-1 IP-A from the c line and the media transport address SBC-1 Port A does not match any call context records it has stored at SBC 2 208. Operation proceeds from step 330 to step 331.

In step 331, the SBC 2 208 determines that the IP address SBC-1 IP-A from the c line and the media transport address SBC-1 Port A from SIP INVITE message 326 matches the IP address and port assigned to SBC 1 206. Operation proceeds from step 331 to step 332.

In step 332, the SBC 2 208 generates and transmits the SIP INVITE request message 334 to SBC 1 206. The SIP INVITE request message 334 includes: (i) Request URI header: "TN-c"; (ii) To header: "To: TN-b"; (iii) From header: "From: TN-a"; (iv) Diversion header: "Diversion: TN-b"; (v) a SDP Offer message which includes "c=SBC-1 IP-A, m=audio SBC-1 Port A"). In some embodiments in step 332, the SBC 2 208 just forwards the received SIP INVITE request 326 to the SBC 1 206. Operation proceeds from step 332 to step 326.

In step 336, the SBC 1 206 receives the SIP INVITE request message 334. Operation proceeds from step 336 to step 338. In step 338, SBC 1 206 determines that the SIP INVITE request is a diverted SIP INVITE request from information included in the SIP INVITE message 334, e.g., diversion header and/or the URI and To headers. Upon determining that the SIP INVITE request message 334 is a diverted SIP INVITE request message, i.e., the SIP INVITE request message 334 corresponds to a diverted call, the SBC 1 206 extracts the IP address and media address from the c and m lines of the SDP offer message included in the SIP INVITE request message 334. Operation proceeds from step 338 to step 340.

In step 340, SBC 1 206 determines that the IP address SBC-1 IP-A and port SBC-1 Port-A are assigned to SBC 1 206. Operation proceeds from step 340 to step 342.

In step 342, SBC 1 206 identifies the call context record in its storage device, e.g., memory based on information contained in the SDP offer message of the SIP INVITE request message 334. In some embodiments, the SBC 1 206 uses the determined IP address and port number/address from the SDP offer message as an identifier or key to the call context records to locate the matching call context stored in its memory. Once the call context record corresponding to the call to which the SIP INVITE message 334 corresponds has been identified, the SBC retrieves the stored Identity header from the call context record. Operation proceeds from step 342 to step 344.

In step 344, the SBC 1 206 generates the SIP INVITE request message 348 based on the SIP INVITE request message 334 and the Identity header retrieved from the matching call context record. In this example the retrieved Identity header is "Identity: shaken PASSport {attest=full, orig/dest=a/b}". The SIP INVITE request message 348 includes: (i) Request URI header: "TN-c"; (ii) To header: "To: TN-b"; (iii) From header: "From: TN-a"; (iv) Diversion header: "Diversion: TN-b"; (v) Identity header: "Identity: shaken PASSporT{attest=full, orig/dest=a/b} Identity:div PASSport{orig/dest/div=a/c/b}; (vi) a SDP Offer message which includes "c=SBC-1 IP-A, m=audio SBC-1 Port A"). Operation proceeds from step 344 to step 346.

In step 346, the SBC 206 transmits the generated SIP INVITE message 348 to the endpoint device 214 located in the Service Provider-c Network or to a network device in the Service Provider-c network which will verify the Identity information before sending the SIP INVITE message or call to the endpoint device 214.

Each of the plurality of SBCs in the Service Provider-b network know or can determine the IP address and media port address/port number assigned to the other SBCs in the Service Provider-b network or at least all of the SBCs which will be involved in transmitting call initiation messages, e.g., SIP INVITE requests, to and receiving diverted call initiation messages, e.g., diverted SIP INVITE requests, from the endpoint device 212.

If in step 330, the SBC 2 208 determines from the information included in the SDP offer message of the SIP INVITE message 326 that the IP address from the c line and the media transport address from the m line does match a call context record it has stored at SBC 2 208 then the method would bypass step 331, 332, 336, 338, 340 and SBC 2 208 would perform steps 342 and 344. This would be the case in which the SBC 2 206 received the SIP INVITE message 310 in step 312 instead of SBC 1 206 and performed steps 314, 315, and 316. That is the same SBC transmits the message 318 to the endpoint device 212 that receives the diverted SIP message 326 from the endpoint device 212. One case in which this happens is when the endpoint device 212 is being serviced by a single SBC.

The call initiation signaling in the example signaling 300 progresses the communications links 216, 218, 220, 222, 224, and 226 in that order. The arrows on those links are there to help provide an understanding of the progression of the call signaling but it should be understood that the communications links may be wireless or wired bi-directional links.

The method/signaling diagram 300 illustrates the steps and signaling of an exemplary method of preserving the original attestation/signature information for diverted calls in accordance with one embodiment of the present invention.

In some embodiments of the method 300, SBC 1 206 stores the Identity header along with call identifying information within a record, e.g., a context record, at a shared storage device or database to which the plurality of SBCs servicing the second endpoint device, e.g., the SBCs 1, 2, . . . , N have access. Whenever, any of the plurality of SBCs servicing the second endpoint device 212 receive a diverted SIP INVITE message from the second endpoint device 212, the SBC which receives the diverted SIP INVITE message accesses the shared storage device or database and uses call identifying information, e.g., media IP address and port address, to retrieve the stored Identity header from the shared storage device or device. Once the SBC retrieves the stored Identity header it can use received diverted SIP INVITE message and retrieved Identity header to generate the SIP INVITE message 348 to send to the endpoint device 214.

In some embodiments of the method 300, SBC 1 206 in addition to storing the Identity header in the call context record stored at the SBC 1 206, the SBC 1 also stores the Identity header along with call identifying information within a record at a shared storage device or database to which the plurality of SBCs servicing the second endpoint device, e.g., the SBCs 1, 2, . . . , N have access. In such systems, SBC 2 208 upon receiving the diverted SIP INVITE request message 326 and determining that the media stream IP address and port in the SDP offer message did not match a media IP address and port assigned to the SBC 2 208 then it accesses or obtains from the shared storage device, the Identity header corresponding to the call for the SIP INVITE request message 326 using the media IP address and port information obtained from the SDP offer message in the SIP INVITE request 326. If the media IP address and port match, to a call that the SBC 2 208 is handling which would be the case when the SBC 2 208 receives the SIP INVITE request message 310 instead of SBC 1 206 then the SBC 2 208 can obtain the stored Identity header from the call context record at the SBC 2 208. As SBC 2 208 would have stored the Identity header from the message 312 in a call context record in the memory of SBC 2 208.

In some embodiments, instead of communicating the SIP message 334 to the SBC 1 206, the second SBC 208 sends a request to the SBC 1 206 with the media IP address and port address/number extracted from the SDP offer message included in the SIP INVITE message 326 and requests that the SBC 1 206 provide the Identity header stored in the call context record at the SBC 1 206 which matches the media IP address and port address/number. The SBC 1 206 in response to receiving the request for the Identity header from SBC 2 208 transmits the Identify header from the matching call context record to the SBC 2 208. The SBC 2 208 then generates the SIP INVITE message 348 based on the received SIP INVITE request message 326 and the Identity header received from the SBC 1 206 and transmits the generated SIP INVITE message 348 to the endpoint device 214.

Each of the pieces of equipment and/or devices described herein in some embodiments include a processor and memory. The memory including instructions which when executed by the processor control the device to perform one or more operations, tasks or steps of the various embodiments described herein.

Figure 4:
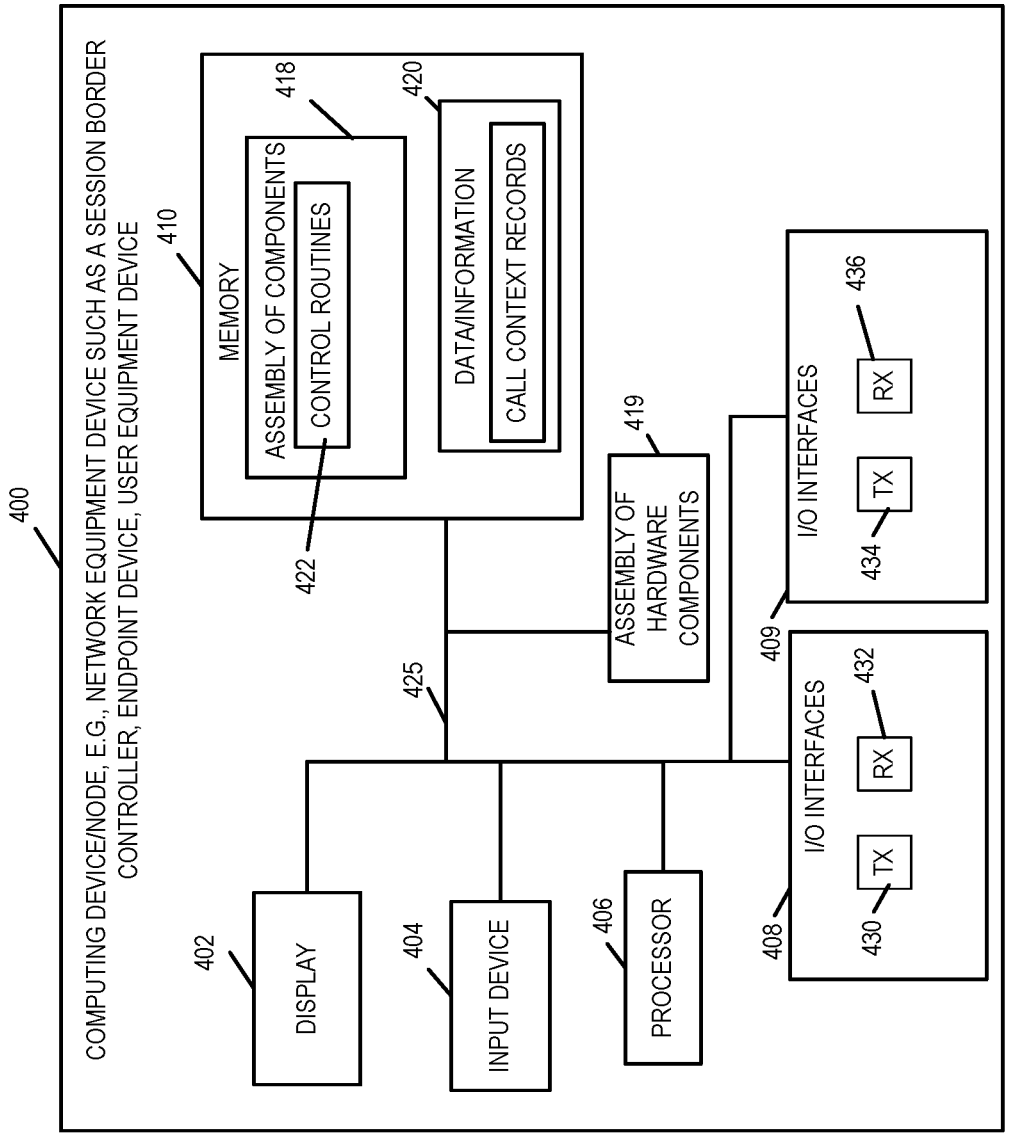
FIG. 4 illustrates an exemplary computing device in accordance with an embodiment of the present invention.

FIG. 4 illustrates an exemplary computing device, e.g., a network equipment device such as a Session Border Controller in accordance with an embodiment of the present invention.

Exemplary computing device/node 400 includes an optional display 402, an input device 404, a processor 406, e.g., a CPU, I/O interfaces 408 and 409, which couple the computing device/node 400 to networks or communications links and/or various other nodes/devices, memory 410, and an assembly of hardware components 419, e.g., circuits corresponding to different components and/or modules, coupled together via a bus 425 over which the various elements may interchange data and information. Memory 410 includes an assembly of components 418, e.g., an assembly of software components, and data/information 420. The assembly of software components 418 includes a control routines component 422 which includes software instructions which when processed and executed by processor 406 control the operation of the computing device/node 400 to perform various functions and/or one or more steps of the various method embodiments of the invention. The I/O interface 408 includes transmitters 430 and receivers 432. The I/O interface 409 includes transmitters 434 and receivers 436. The I/O interfaces are hardware interfaces including hardware circuitry. The computing device/node 400 is also configured to have a plurality of Internet Protocol (IP) address/port number pairs, e.g., logical IP address/port pairs, for use in exchanging signaling information and for use in the communication of a media stream or flow that is part of a call flow. In some embodiments the I/O interfaces include IP address/port pairs. The I/O interfaces in some embodiments are configured to communicate in accordance with the Session Initiation Protocol (SIP), Session Description Protocol (SDP), Internet Protocol (IP), Transport Control Protocol (TCP), User Datagram Protocol (UDP), SQL (Structured Query Language being used to interface and access information from the various databases and/or storage devices to which it may be coupled. In some embodiments, the computing device/node 400 includes a communication component configured to operate using SIP, SDP, IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the computing device/node 400 can include more than one processor with the processing being distributed among the plurality of processors. In some embodiments, one or more of the following are implemented in accordance with the computing device/node 400 illustrated in FIG. 1 or 2: Endpoint 202, network equipment device 1 204, SBC 1 206, SBC 2 208, . . . , SBC N 210, endpoint device 212 and endpoint device 214, end-user device 2, Secure Telephone Identity—Authentication Server STI-AS.

In yet another embodiment discussed in connection with FIG. 1, where the first network element serving the original/ diverted calls are the same or state can be synchronized between them or the element handling the diverted call can relay the INVITE to the element handling the original call an exemplary method includes the steps of:

Storing Identity(shaken) received in INVITE at point [1] on a per TN-a/Tn-b basis as FIFO (a separate FIFO for each pair)

Adding to FIFO with each matching INVITE at point [1] with Identity(shaken)

FIFO is deleted if there are no remaining entries

When network equipment receives INVITE at point [4], the network equipment performs a lookup on stored Identity(shaken) headers based on Tn-a/Tn-b If a match is found get the first entry of FIFO and use it If more than one SP-b network equipment acts as directly communicating with IP-PBX then the FIFO information is shared among the SP-b network equipment which directly communicate with the IP-PBX.

Figure 6:
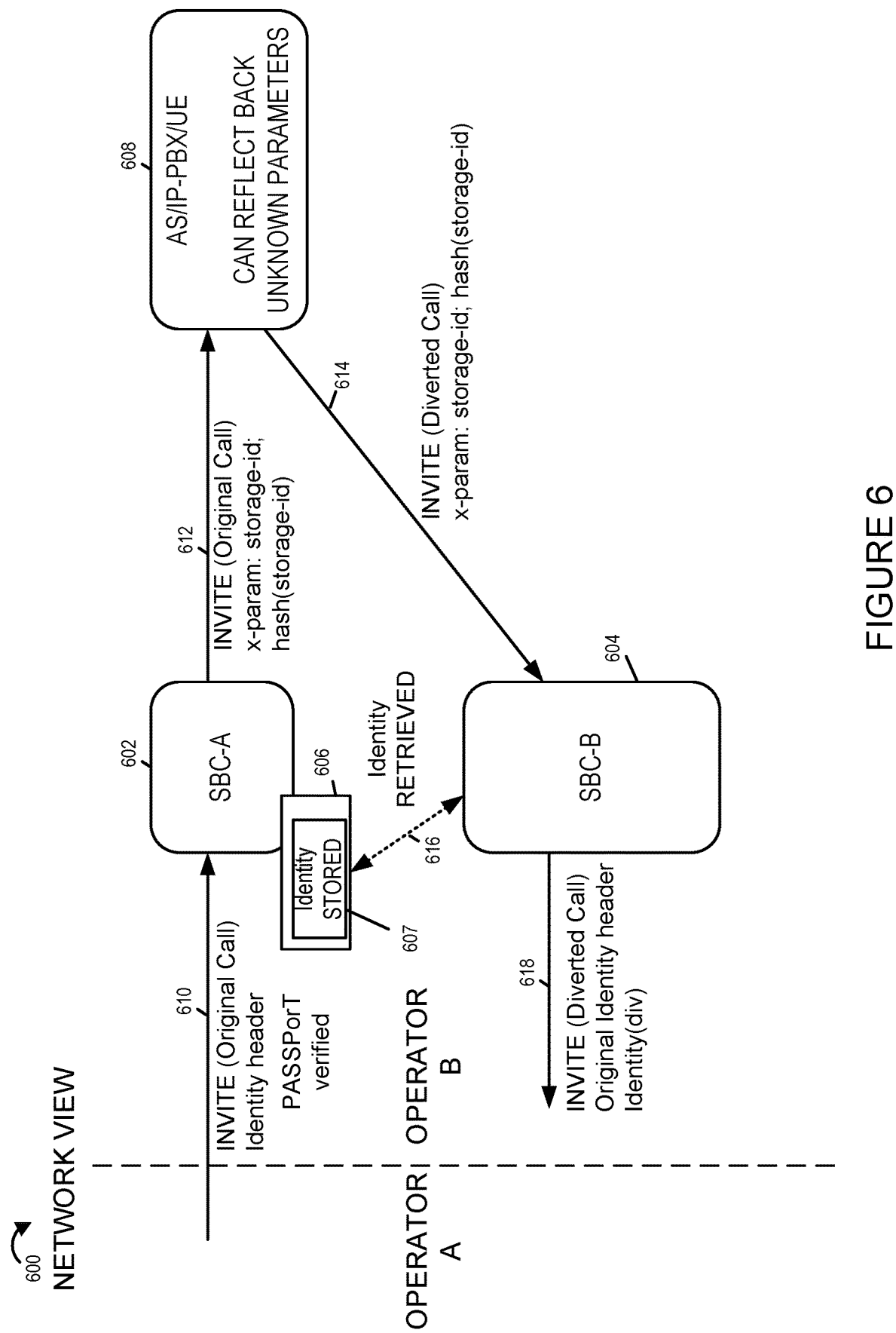
FIG. 6 illustrates another exemplary system and method in accordance with an embodiment of the present invention.
Figure 7:
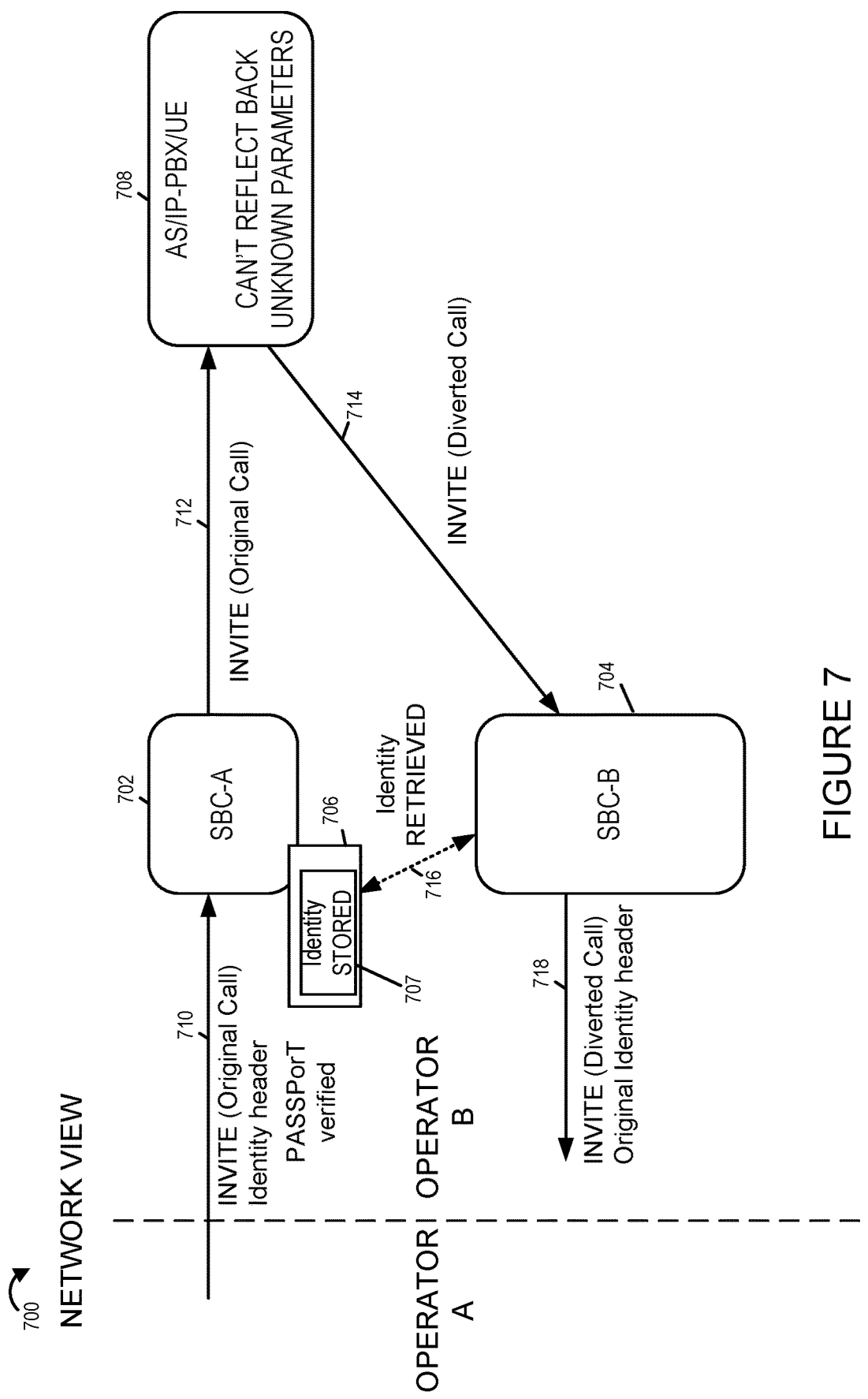
FIG. 7 illustrates another exemplary system and method in accordance with an embodiment of the present invention.

FIGS. 6 and 7 illustrate the details of additional exemplary embodiments of the present invention for preserving Identity header information during diversion.

In the embodiment of FIG. 6 a network entity that receives a message, i.e., SBC-A 602, extracts the Identity header information from the received message and stores it for future use, e.g., in a record in a storage device or database, i.e., storage device 606. The storage device in many embodiments is a shared storage device accessible to other network equipment devices in same network as the SBC-A 602 such as for example SBC-B 604. A storage-Identifier which can be used to retrieve the stored Identity header information is sent to a diverting entity, i.e., AS/IP or IP-PBX or a user equipment device 608, that can reflect back unknown parameters. The storage ID is sent as an integrity protected reference, e.g., by being encrypted or with a hashed value. The reflected integrity protected reference is then used to retrieve and use the stored Identity header information, e.g., by retrieving it from the storage device and using it when generating a diverted call message with Identity header information.

Diagram 600 of FIG. 6 which illustrates another exemplary embodiment of the present invention which will now be discussed in further detail with respect to the steps of an exemplary method and operation of the devices of the exemplary system. In diagram 600, Session Border Controller A (SBC-A) 602 and Session Border Controller B (SBC-B) 604 are exemplary network equipment located in Network Operator B's network. End-point device 608 is for example an Application Server, an IP-PBX or a User Equipment device which can reflect back unknown parameters. End-point device 608 is located in Network Operator B's network and is coupled to and serviced by SBC-A 602 and SBC-B 604. Storage device 606 is a shared storage device coupled to both SBC-A 602 and SBC-B 604. In this example, message 610 is a SIP INVITE (Original Call) message 610 is received from Operator A's network by SBC-A 602. SBC-A 602 is located in Operator B's network. Message 610 includes an Identity header that is PASSPort verified. After SBC-A 602 receives the SIP INVITE message 610, it determines that it is destined for endpoint device 608 which may be, and in some embodiments is a Application Server or an IP-PBX, User Equipment device. The SBC-A 602 then extracts the Identity header from the SIP INVITE message and stores it in a record 607 in storage device 606, e.g., a shared database. The SBC-A 602 generates SIP INVITE message 612 which includes a x-parameter: storage-id; hash(storage-id). The x-parameter being a proprietary SIP parameter. The storage-id being a record identifier which identifies the record 607 in which the original Identity header from the SIP message 610 has been stored. The hash(storage-id) indicates that the storage-id value has been processed by a hash function from which the hash(storage-id) value was generated. In some embodiments only the record identifier or the hash value of the record identifier is included in the X-parameter. As the destination for the generated SIP INVITE message 612 is an endpoint device, no Identity header is included in the SIP INVITE message 612. The SBC-A 602 transmits the generated SIP INVITE message 612 to the endpoint device 608. Endpoint device 608 receives the SIP INVITE message 612. The Endpoint device 608 has a call forwarding or call re-targeting function enabled. Endpoint device 608 has the ability to reflect back unknown parameters, i.e., it will reflect parameters back when a call is diverted, e.g., forwarded or re-targeted. In this example, endpoint device 608 generates diverted SIP Invite message 614 based on received SIP INVITE message 612. The SIP INVITE message 614 includes a Diversion header or a history-info header indicating that the SIP INVITE message has been diverted as well as the x-parameter:

storage-id; hash(storage-id). The endpoint device 608 transmits the diverted SIP INVITE message 614 to the SBC-B 604 which along with SBC-A 602 provides services to endpoint device 608. SBC-B 604 receives the diverted SIP INVITE message 614 from the endpoint device 608. Following receipt of the diverted SIP INVITE message 614, the SBC-B 604 determines that the diverted SIP INVITE message 614 was diverted by endpoint device 608. In some embodiments, the SBC-B 604 makes this determination based on information included in a SIP Diversion header or a SIP History-Info header included in the received SIP INVITE message 614. After determining that the SIP INVITE message 614 is a diverted SIP INVITE message, SBC-B 604 extracts the proprietary x-param: storage-id: hash(storage-id) and uses the extracted information to retrieve the Original Identity Header stored in record 607 from storage device 606. SBC-B then generates the SIP INVITE message 618 which includes information for the diverted call as well as the Original Identity header retrieved from the record 607 and an Identity (div) header for the diversion by end-point device 608. The SBC-B 604 transmits the SIP INVITE message 618 toward the diverted destination device which in this example is shown as being a device in Operator's A's network as the SIP INVITE message 618 is directed toward Operator A's network. In some embodiments, instead of the Identity header from SIP INVITE message 610 being stored in the record 607, Identity header information is stored in the record 607 such as the attestation level of the Identity header without the entire Identity header being stored in record 607. In such systems, SBC-B 604 retrieves the Identity header information from the record 607 and uses the retrieved Identity header information, e.g., attestation level, to generate an Identity header for the SIP INVITE message 618.

In the system and method described in connection with FIG. 6, the received original Identity header is stored by the SBC-A 602 and an integrity protected reference (storage-ID) which identifies the record in which original Identity header was stored is sent to the diverting entity 608. The diverting entity 608 reflects back the integrity protected reference (storage-id) to SBC-B 604 which extracts the integrity protected reference (storage-id) and uses it to retrieve the original Identity header from the record in which it is stored. In some embodiments, the integrity protected reference is encrypted using a shared key known to both SBC-A 602 and SBC-B 604 so that SBC-B 604 can decrypt it upon receipt. In some embodiments, instead of the diverting entity 608 transmitting the diverted SIP INVITE message to SBC-B 604 it diverts it back to SBC-A 602 such as when SBC-A602 is the only SBC which provides services to the diverting entity 608. In such cases, SBC-A 602, follows the same steps as SBC-B 604 discussed above in connection with determining the received diverted SIP INVITE message is a diverted call, and then obtaining the storage-id from the diverted SIP INVITE message, and then using the obtained storage-id to identify the record 607 in storage device 606 and retrieve the original Identity header from the record 607, and finally to generate the diverted SIP INVITE message 618 using the original Identity header.

In additional embodiments such as those shown in diagram 700 of FIG. 7, no record identifier (e.g., storage-ID) is sent to the diverting device because the diverting device does not reflect unknown parameters. While the original Identity header is still stored, the record in which it stored also includes call identification information, e.g., SDP content information such as a SBC IP address and a UDP port for a media session for the call or From/To header content information from which the original call which was diverted can be identified. This SDP content information and/or From/To header content information will be included in the diverted SIP INVITE message and can be used by a receiving SBC to identify the record containing the original Identity header.

Diagram 700 of FIG. 7 which illustrates another exemplary embodiment of the present invention will now be discussed in further detail with respect to the steps of an exemplary method and operation of the devices of the exemplary system. In diagram 700, Session Border Controller A (SBC-A) 702 and Session Border Controller B (SBC-B) 704 are exemplary network equipment located in Network Operator B's network. End-point device 708 is for example an Application Server, an IP-PBX or a User Equipment device which can not reflect back unknown parameters. End-point device 708 is located in Network Operator B's network and is coupled to and serviced by SBC-A 702 and SBC-B 704. Storage device 706 is a shared storage device coupled to both SBC-A 702 and SBC-B 704. In this example, message 710 is a SIP INVITE (Original Call) message 710 which is received from Operator A's network by SBC-A 702. SBC-A 702 is located in Operator B's network. Message 710 includes an Identity header that is PASSPort verified. After SBC-A 702 receives the SIP INVITE message 710, it determines that it is destined for endpoint device 708 which may be, and in some embodiments is a Application Server or an IP-PBX, User Equipment device. The SBC-A 702 then extracts the Identity header from the SIP INVITE message and stores it in a record 707 in storage device 706, e.g., a shared database. The SBC-A 702 also stores in the record 707 call identification information which can be used to identify the call. In some embodiments, the record 707 is a call context record. And, the call identification information stored with the original Identity header from the SIP message 710 is an SBC IP address and UDP port for SBC-A 702 which is to be used for a media session of the call. The SBC IP address and UDP port which are stored in the record 707 are also included in an SDP Offer message included in the SIP INVITE message 712 generated by SBC-A 702. As the destination for the generated SIP INVITE message 712 is an endpoint device, no Identity header is included in the SIP INVITE message 712. The SBC-A 702 transmits the generated SIP INVITE message 712 to the endpoint device 708. Endpoint device 708 receives the SIP INVITE message 712. The Endpoint device 708 has a call forwarding or call re-targeting function enabled. In this example, endpoint device 708 generates diverted SIP Invite message 714 based on received SIP INVITE message 712. The SIP INVITE message 714 includes a Diversion header or a history-info header indicating that the SIP INVITE message has been diverted as well as the SDP Offer message which includes the SBC IP address and UDP port for SBC-A 702 which is to be used for a media session of the call. The endpoint device 708 transmits the diverted SIP INVITE message 714 to the SBC-B 704 which along with SBC-A 702 provides services to endpoint device 708. SBC-B 704 receives the diverted SIP INVITE message 714 from the endpoint device 708. Following receipt of the diverted SIP INVITE message 714, the SBC-B 704 determines that the diverted SIP INVITE message 714 was diverted by endpoint device 708. In some embodiments, the SBC-B 704 makes this determination based on information included in a SIP Diversion header or a SIP History-Info header included in the received SIP INVITE message 714. After determining that the SIP INVITE message 714 is a diverted SIP INVITE message, SBC-B 704 extracts the SBC IP address and UDP port number for SBC-A 702 which is to be used for a media session of the call.from the SDP Offer message included in SIP INVITE message 714 and uses the extracted information to identify the record 707 in the storage device 706 as containing information for the call. The SBC-A 702 then retrieves the Original Identity Header stored in record 707 from storage device 706. SBC-B then generates the SIP INVITE message 718 which includes information for the diverted call as well as the original Identity header retrieved from the record 707 and an Identity (div) header for the diversion by end-point device 708. The SBC-B 704 transmits the SIP INVITE message 718 toward the diverted destination device which in this example is shown as being a device in Operator's A's network as the SIP INVITE message 718 is directed toward Operator A's network. In some embodiments, instead of the Identity header from SIP INVITE message 710 being stored in the record 707, Identity header information is stored in the record 707 such as the attestation level of the Identity header without the entire Identity header being stored in record 707. In such systems, SBC-B 704 retrieves the Identity header information from the record 707 and uses the retrieved Identity header information, e.g., attestation level, to generate an Identity header for the SIP INVITE message 718.

Instead, of the SDP content information of the SBC IP address and UDP port for a media session being used as the call identification information to identify the matching record, e.g., call context record, containing the original Identity header, all call information can be used in place of or in addition to the SDP content information. For example, in some embodiments information from the SIP INVITE 710 message's To/From headers are used as the call identifying information as the information contained in the To/From headers will also be included in the diverted SIP INVITE message and can be extracted and utilized to identify the record 707 which includes the stored original Identity header and the To/From Header header information.

While diagram 600 of FIG. 6 illustrates an example where a diverting entity can reflect back unknown parameters and the diagram 700 of FIG. 7 illustrates an example where a diverting entity can not reflect back unknown parameters, in at least some instances it will be unknown whether the diverting entity will be able to reflect back unknown parameters. To address such situations, the methods and techniques employed in connection with the systems of FIGS. 6 and 7 to preserved the original Identity header and/or attestation level are jointly applied. In such situations, the original Identity header or original Identity header information is stored in a record in the storage device along with a record identifier or storage ID as well as call identification information which can be used to identify the call in which the original Identity header was received such as for example the SBC IP address and UDP port number for a media session for the call. In the SIP INVITE message sent to the diverting entity, a proprietary header, proprietary parameter, or tag includes the record identifier or storage ID and the body of an SDP offer message included in the SIP INVITE message will include the SBC IP address and UDP port number for the media session for the call. In this way, when the diverted SIP INVITE message is received at the second SBC will be able to use record identifier if it was reflected by the diverting entity and if it was not then the call identification information, e.g., the SBC IP address and port number for the media session included in the SDP Offer message which will have been included in the diverted SIP Invite message by the diverting entity In some embodiments of the invention, an SBC trunk group on which the diverted SIP INVITE message is received at the SBC receiving the diverted message is used to identify a record containing the original Identity header. In such embodiments, the SBC that stores the original Identity header is aware of which SBC trunk group is used by the diverting device to communicate with the receiving SBC and includes this trunk group information in the record with the original Identity header. One example of this case is when a signal SBC services the endpoint device which is the diverting device, e.g., an IP-PBX, and the SBC has assigned a particular SBC trunk group for use in receiving communications from the diverting device.

In some embodiments, a source Internet Protocol (IP) address transport protocol port of an IP packet carrying the diverted SIP Invite message is used to identify the stored record containing the original Identity header. The record containing the stored Identity header also including the source IP address transport protocol port of the IP packet.

Figure 8A:
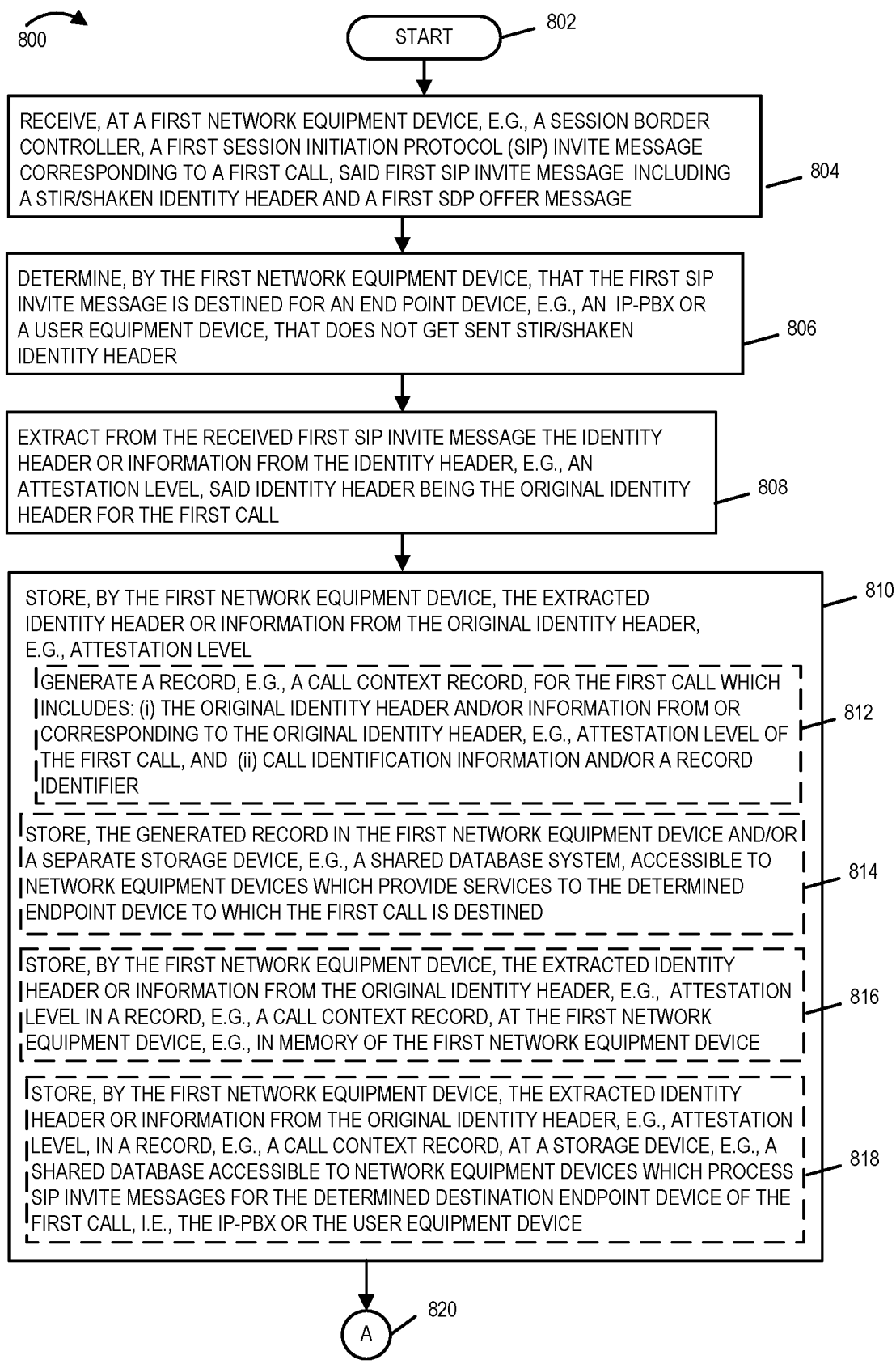
FIG. 8A illustrates a first part of a flowchart of an exemplary method in accordance with an embodiment of the present invention.
Figure 8B:
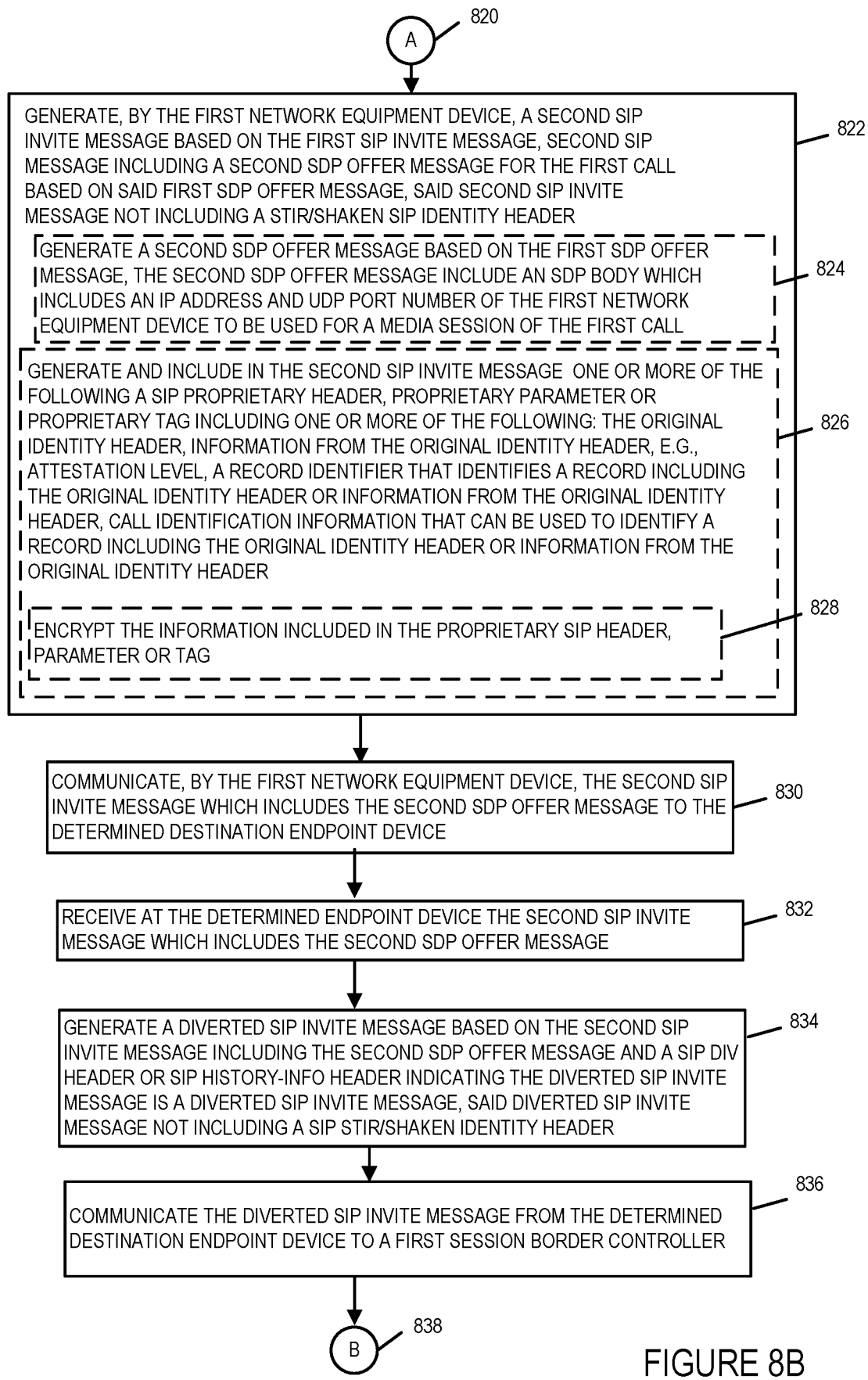
FIG. 8B illustrates a second part of a flowchart of an exemplary method in accordance with an embodiment of the present invention.
Figure 8C:
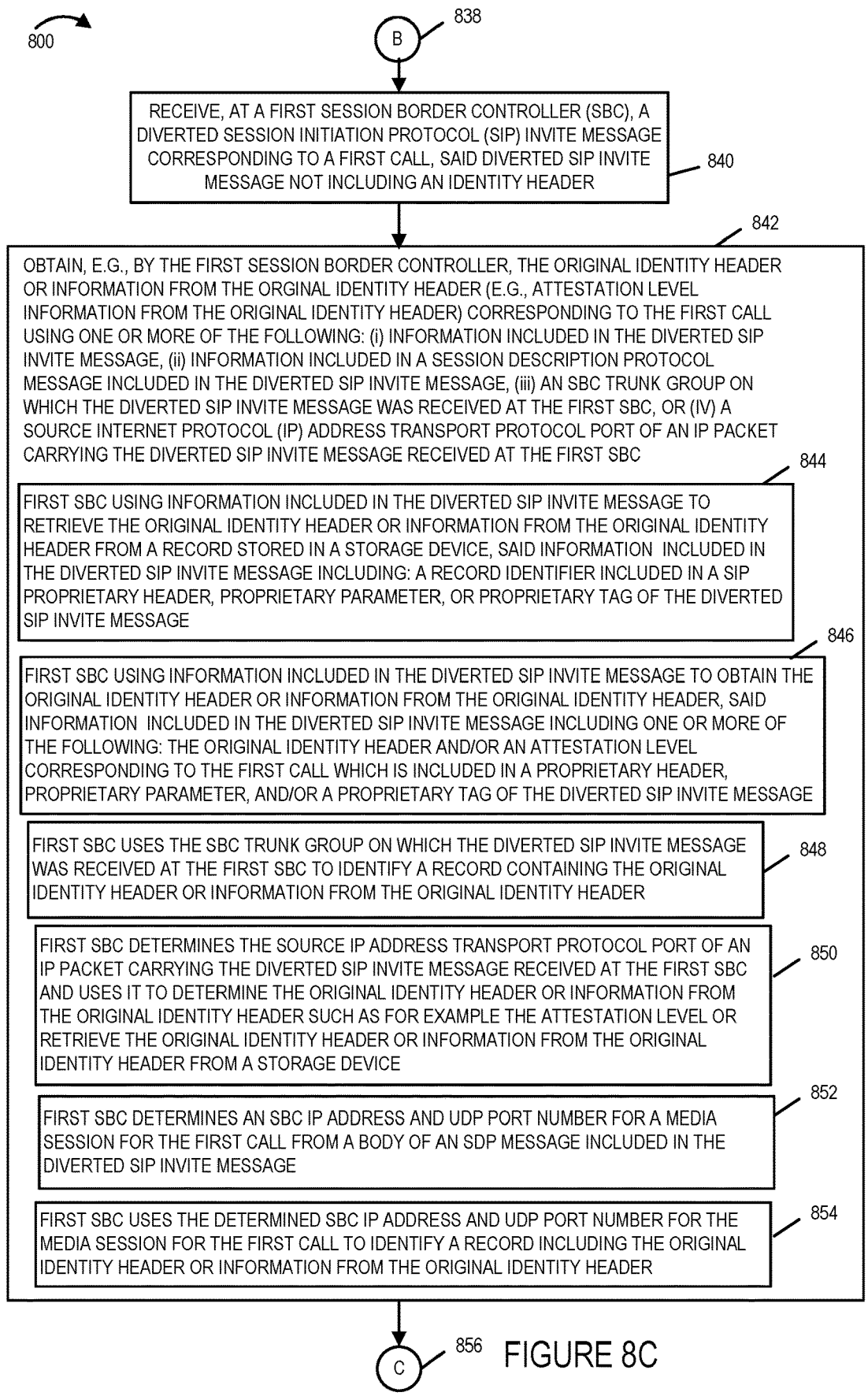
FIG. 8C illustrates a third part of a flowchart of an exemplary method in accordance with an embodiment of the present invention.

FIG. 8 shows the combination of FIGS. 8A, 8B, 8C and 8D. FIG. 8A illustrates a first part of a flowchart of an exemplary method 800 in accordance with an embodiment of the present invention. FIG. 8B illustrates a second part of a flowchart of an exemplary method 800 in accordance with an embodiment of the present invention. FIG. 8C illustrates a third part of a flowchart of an exemplary method 800 in accordance with an embodiment of the present invention. FIG. 8D illustrates a fourth part of a flowchart of an exemplary method 800 in accordance with an embodiment of the present invention.

The method 800 commences in start step 802 shown on FIG. 8 wherein a first network equipment device, an endpoint device, e.g., user equipment device or IP-PBX, a first Session Border controller and in some embodiments a separate storage device, e.g., shared database system, which are part of a first Operator's network are initialized. The first network equipment device in some embodiments is a Session Border Controller. The first network equipment device, first SBC, endpoint device, and storage device of the first Operator's network are coupled together via one or more communications links. The exemplary method 800 may be, and in some embodiments is, implemented using exemplary communications system 200 shown in FIG. 2. In such instances, for example, the first network equipment device may be, and in some embodiments is SBC 1 206, the first SBC is SBC 2 208 and the endpoint device is device 214. Operation proceeds from start step 802 to step 804.

In step 804, a first network equipment device, e.g., SBC 1 206 of system 800, receives a first Session Initiation Protocol (SIP) Invite message corresponding to a first call, said first SIP Invite message including a STIR/SHAKEN Identity header and a first SDP Offer message. Operation proceeds from step 804 to step 806.

In step 806, the first network equipment device determines that the first SIP Invite message is destined for an endpoint device, e.g., an IP-PBX or a user equipment device, e.g., endpoint device 212 of system 200. In some embodiments, the first network equipment device further determines that the endpoint device is a device that is not sent a STIR/SHAKEN SIP Identity header. Operation proceeds from 806 to step 808.

In step 808, the first network equipment device extracts fromt eh received first SIP Invite message the Identity header or information from the Identity header, e.g., an attestation level from the Identity header. This Identity header from the first SIP Invite message being referred to in the method 800 as the original Identity header for the first call or simply the original Identity header. Operation proceeds from step 808 to step 810.

In step 810, the first network equipment device stores the extracted original Identity header or information from the original Identity header, e.g., attestation level, e.g., in a record in the memory of the first network equipment device and/or in a separate storage device, e.g., storage device 205 of system 200. The storage device may be, and in some embodiments is a database system with a processor and memory that can receive and process commands, instructions, and/or requests to store and retrieve data, information, and records. In some embodiments step 810 includes one or more sub-steps 812, 814, 816, and 818. In sub-step 812, the first network equipment device generates a record, e.g., a call context record, for the first call which includes: (i) the original Identity header and/or information from or corresponding to the original Identity header, e.g., attestation level of the first call, and (ii) call identification information and/or a record identifier. In sub-step 814, the first network equipment device stores the generated record in the first network equipment device and/or a separate storage device, e.g., a shared database system, accessible to network equipment devices (e.g., SBC 1 206, SBC 2 208, . . . , SBC N 210 of system 200) which provide services to the determined endpoint device (endpoint device 212 of system 200) to which the first call is destined. In sub-step 816, the first network equipment device stores the extracted original Identity header or information from the extracted original Identity header, e.g., attestation level in a record, e.g., a call context record, at the first network equipment device, e.g., in memory of the first network equipment device. In sub-step 818, the first network equipment device stores the extracted Identity header or information from the extracted original Identity, e.g., attestation level, in a record, e.g., a call context record, at a storage device, e.g., a shared database accessible to network equipment devices which process SIP Invite messages for the determined destination endpoint device of the first call, e.g., endpoint device 212 of system 200. Operation proceeds from step 810 via connection node A 820 to step 822 shown on FIG. 8B.

In step 822, the first network equipment device generates a second SIP Invite message based on the first SIP Invite message, said second SIP Invite message not including a STIR/SHAKEN SIP Identity header. In at least some embodiments, he second SIP Invite message includes a second SDP offer message for a media session for the first call based on the first SDP offer message. In some embodiments, step 822 includes one or more of the sub-steps 824 and 826. In sub-step 824, the first network equipment device generates a second SDP Offer message based on the first SDP offer message. The second SDP offer message including a SDP body which includes an IP address and UDP (User Datagram Protocol) port number of the first network equipment device to be used for a media session of the first call. In sub-step 826, the first network equipment device generates and includes in the second SIP Invite message one or more of the following: (i) a SIP proprietary header, (ii) a SIP proprietary parameter, or (iii) a SIP proprietary tag. The SIP proprietary header, SIP proprietary parameter and/or the SIP proprietary tag including one or more of the following: (i) the original Identity header, (ii) information from the original Identity header, e.g., attestation level, and/or (iii) a record identifier that identifies a record in which the original Identity header or information from the original Identity header has been stored. In some embodiments, call identification information that can be used to identify a record in which the original Identity header or information from the original Identity header is stored is included in (i) a SIP proprietary header, (ii) a SIP proprietary parameter, or (iii) a SIP proprietary tag. However, this is an atypical case as the call identification information is more typically information from a non-proprietary header, parameter or tag of the SIP Invite message or the SDP message included within the SIP Invite message. In some embodiments, sub-step 826 includes sub-step 828. In sub-step 828, the first network equipment device encrypts the information included in the proprietary SIP header, parameter or tag. The encryption is performed to protect the information from malicious actors who may wish to utilize the information for improper purposes if the intercepted, e.g., spoofing.

It is to be understood that while in some embodiments the original Identity header is encapsulated or placed in a proprietary SIP header, parameter or tag this is different from including an SIP Identity header, i.e., a STIR/SHAKEN Identity header as it is not accordance with the standards and is not identified as a STIR/SHAKEN Identity header. The Identity header is instead included in a proprietary header, parameter or tag of the SIP Invite and is not included as a SIP Invite STIR/SHAKEN Identity header.

Operation proceeds from step 828 to step 830. In step 830, the first network equipment device communicates, e.g., transmits, the second SIP Invite message which includes the second SDP Offer message to the determined destination endpoint device. Operation proceeds from step 830 to step 832.

In step 832, the determined destination endpoint device, e.g., endpoint device 212 of system 200, receives the second SIP Invite message which includes the second SDP offer message. Operation proceeds from step 832 to step 834.

In step 834, the endpoint device generates a diverted SIP Invite message based on the second SIP Invite including the second SDP offer message. The Diverted SIP Invite message does not include a SIP STIR/SHAKEN Identity header. In many embodiments, the diverted SIP Invite includes a SIP Div header and/or SIP History-Info header indicating the diverted SIP Invite message is a diverted SIP Invite message, such as a forwarded or retargeted SIP Invite message or call. Operation proceeds from step 834 to step 836.

In step 836, the diverted SIP Invite message is communicated from the determined destination endpoint device to a first SBC, e.g., SBC 2 208 of system 200. Operation proceeds from step 836 via connection B 838 to step 840 shown on FIG. 8C.

In step 840, the first SBC receives the diverted SIP Invite message corresponding to the first call. The diverted SIP Invite message as previously discussed does not include a STIR/SHAKEN SIP Identity header though it may include a proprietary SIP header, parameter and/or tag including the original Identity header or information from the original Identity header. Operation proceeds from step 840 to step 842.

In step 842, obtain, e.g., by the first session border controller, the original identity header or information from the original identity header (e.g., attestation level information from the original header) corresponding to the first call using one or more of the following: (i) information included in the diverted SIP Invite message; (ii) Information included in a Session Description Protocol (SDP) message included in the diverted SIP Invite message, i.e., the second SDP message or a message generated by the endpoint device based on the second SDP message and included in the diverted SIP Invite message by the endpoint device; (iii) an SBC trunk group on which the diverted SIP Invite message was received at the first SBC, or (iv) a source Internet Protocol (IP) address transport protocol port of an IP packet carrying the diverted SIP Invite message received at the first SBC. In some embodiments, step 842 includes one or more sub-steps 844, 846, 848, 850, 852, and 854.

In sub-step 844, the first SBC uses information included in the diverted SIP Invite message to retrieve the original Identity header or information from the original Identity header from a record stored in a storage device, e.g., storage device 205 of system 200. The information included in the diverted SIP Invite message including a record identifier included in a SIP proprietary header, proprietary parameter, or proprietary tag of the diverted SIP Invite message.

In sub-step 846, the first SBC uses information included in the diverted SIP Invite message to obtain the original Identity header or information from the original Identity header. The information included in the diverted SIP Invite message including one or more of the following: the original identity header and/or an attestation level from the original Identity header corresponding to the first call which is included in a proprietary header, proprietary parameter, and/or a proprietary tag of the diverted SIP Invite message.

In sub-step 848, the first SBC uses the SBC trunk group on which the diverted SIP Invite message was received on the first SBC to identify a record containing the original Identity header or information from the original Identity header.

In sub-step 850, the first SBC determines the source IP address transport protocol port of an IP packet carrying the diverted SIP Invite message received at the first SBC and uses it to determine the original Identity header or information from the original Identity header such as for example the attestation level or retrieve the original identity header or information from the original identity header from a storage device.

In sub-step 852, the first SBC determines an SBC IP and UDP port number for a media session for the first call from a body of an SDP message included in the diverted SIP Invite message.

In sub-step 854, the first SBC uses the determined SBC IP address and UDP port number for the media session for the first call to identify a record including the original identity header or information from the original identity header.

Operation proceeds from step 842 via connection node C 856 to step 858 shown on FIG. 8D.

In step 858, the first SBC generates a STIR/SHAKEN SIP Identity header based on the original Identity header or information from the original Identity header (e.g., attestation level from the original Identity header) corresponding to the first call obtained using one or more of the following: (i) information included in the diverted SIP Invite message, (ii) information included in a session description protocol message included in the diverted SIP Invite message, (iii) an SBC trunk group on which the diverted SIP Invite message was received at the first SBC, or (iv) a source Internet Protocol (IP) address transport protocol port of an IP packet carrying the diverted SIP Invite message received at the first SBC. Operation proceeds from step 858 to step 860.

In step 860, the first SBC generates a second diverted SIP Invite message based on the received diverted SIP Invite message. The second diverted SIP Invite message including the original Identity or an Identity header based on information from the original Identity header. The second diverted SIP Invite message also typically including an Identity Div header with information about the diversion from the endpoint device to another device. Operation proceeds from step 860 to step 862.

In step 862, the first SBC communicates, e.g., transmits, the second diverted SIP Invite message toward a diverted destination endpoint device (e.g., endpoint device 214 of system 200) identified by the determined destination endpoint device. Operation proceeds from step 862 to step 864.

In step 864, the process is repeated for additional SIP Invite messages received at the first network equipment device.

Various features which may be, and in some embodiments are included in the method 800 will now be discussed.

In some embodiments, the information included in the diverted SIP Invite message includes information which identifies a record in which the original Identity header or the information from the original Identity header is stored. In some such embodiments, the record is a call context record including a copy of the original Identity header or the information from the original Identity header. In some such embodiments, the information from the original Identity header is an attestation level.

In some embodiments, the information which identifies a record in which the original Identity header or the information from the original Identity header is stored includes one or more of the following: (i) a record identifier and (ii) call identification information. In some embodiments, the information which identifies a record in which the original Identity header or the information form the original Identity header is stored is a record identifier, the record identifier being encrypted and included in a proprietary header, proprietary parameter or proprietary tag of the diverted SIP Invite message. In some embodiments, the encrypting process includes the use of a shared encryption key known to the first network device and the first SBC. In some embodiments, the record identifier is included in a proprietary parameter of a From header included in the diverted SIP Invite message. In embodiments in which the record identifier is encrypted, the first SBC decrypts the encrypted record identifier using the shared encryption key.

In some embodiments, the call identification information which is stored in the record includes a first network equipment device IP address and UDP port number for a media session for the first call. In some embodiments, the first network equipment device is a SBC in which case the call identification information includes a SBC IP address and UDP port number for a media session for the first call. In some embodiments, the first network equipment device IP address and UDP port number for the media session for the first call is included in an SDP body of the SDP message included in the diverted SIP Invite message. The first SBC extracted the call identification information from the SDP offer message included in the diverted SIP Invite message and used to identify the record containing the original Identity header or the information from the original Identity header.

In some embodiments, the record in which the original Identity header or information from the original Identity header is stored is a call context record which also includes an IP address and media port address assigned to the first network equipment device and included in the Session Description Protocol message of the diverted SIP Invite message.

In some embodiments, the first SBC is the first network equipment device. In such embodiments, the record in which the original Identity header or information from the original Identity header is stored is a call context record which also includes an IP address and media port address assigned to the first SBC and included in the Session Description Protocol message of the diverted SIP Invite message.

In some embodiments, the first SBC performs the step of obtaining an original Identity header or information form the original Identity header (e.g., attestation level) corresponding to the first call using one or more of the following: (i) information included in the diverted SIP Invite message, (ii) information included in a SDP message included in the SIP Invite message, (iii) an SBC trunk group on which the diverted SIP Invite message was received at the first SBC, or (iv) a source Internet Protocol (IP) address transport protocol of an IP packet carrying the received diverted SIP Invite received at the first SBC in response to determining by the first SBC that the received diverted SIP Invite message is a diverted call message. In some embodiments, the first SBC makes the determination that the first SIP Invite message is a diverted call message based on a SIP diversion (div) header or a SIP history-info header included in the received diverted SIP Invite message.

In some embodiments, the original Identity header or the attestation level corresponding to the first call is included in a proprietary header, parameter or tag of the diverted SIP Invite message. And, the first SBC obtains the original Identity header and/or the information from the original Identity header by extracting the original Identity header and/or the information from the original Identity header from the diverted SIP Invite message proprietary header, parameter or tag in which it is encapsulated. In some embodiments, the original Identity header and/or information from the original Identity header is also decrypted using a shared key if the original Identity or information from the original Identity header is encrypted by the first network equipment device. The shared encryption key being a key known to both the first network equipment device and the first SBC.

In some embodiments, the record in which the original Identity header or information from the original Identity header is stored additionally includes one or more of the following: (i) a record identifier and/or (ii) call identification information that identifies the record as including information for the first call.

In some embodiments, the call identification information that identifies the record as including information for the first call includes one or more of the following: (i) an SBC trunk group identifier for an SBC trunk group at the first SBC, (ii) a source Internet Protocol (IP) address transport protocol port of the first SBC, and (iii) a SBC IP address and UDP port number of the first network equipment device.

Figure 2:
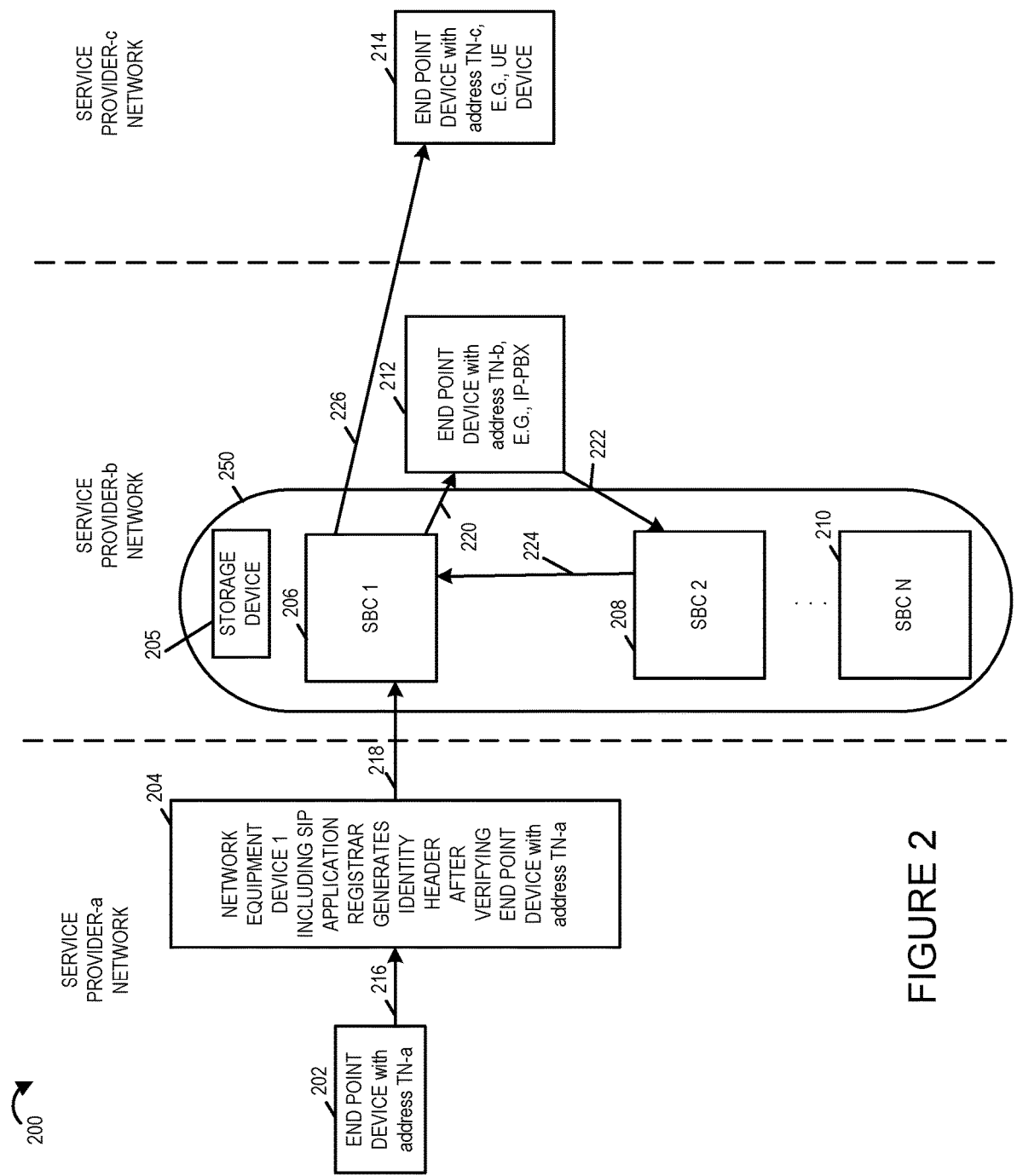
FIG. 2 illustrates an exemplary system in accordance with an embodiment of the present invention.
Figure 3:
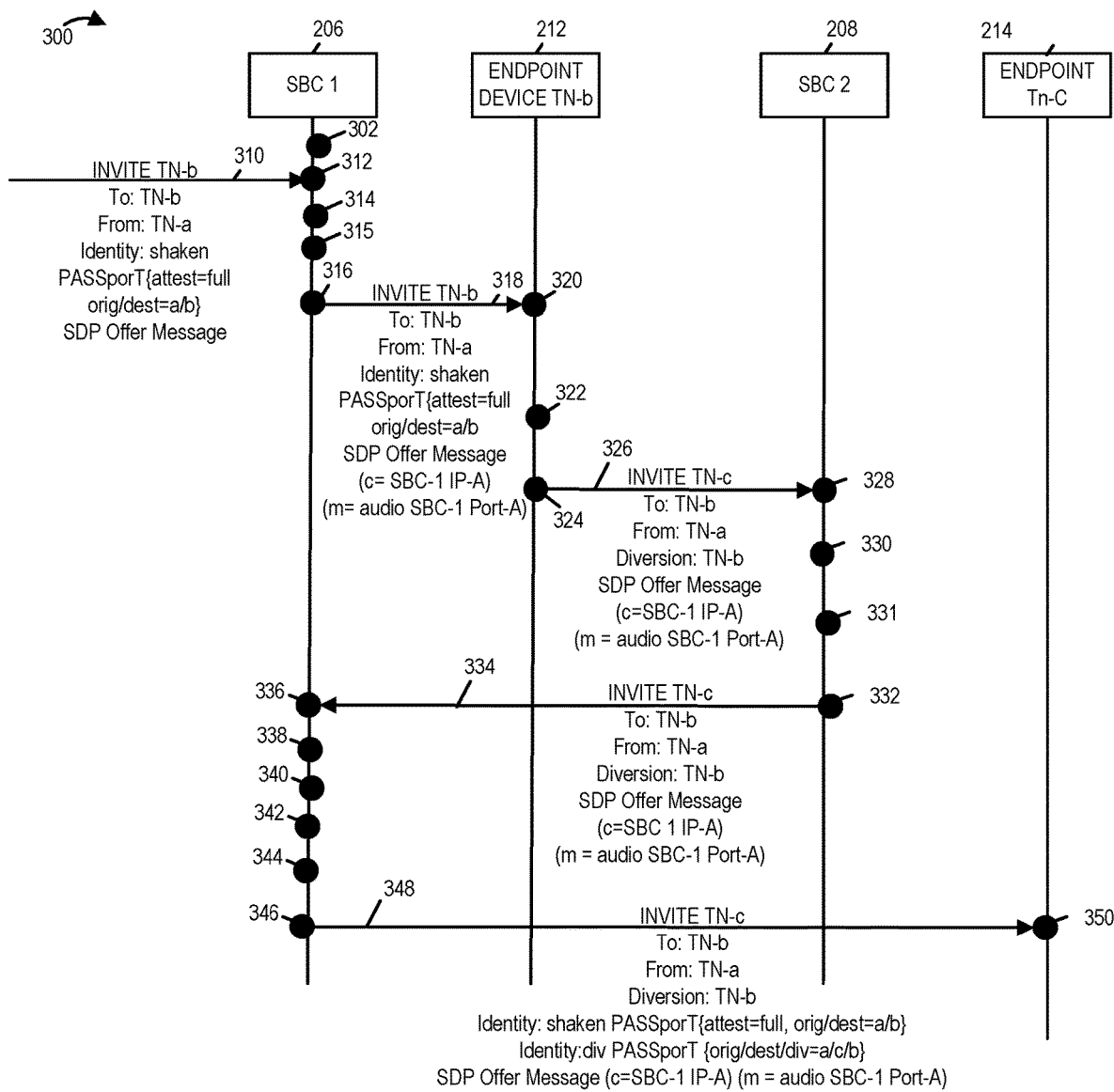
FIG. 3 illustrates an exemplary signaling diagram and method in accordance with an embodiment of the present invention.
Figure 5:
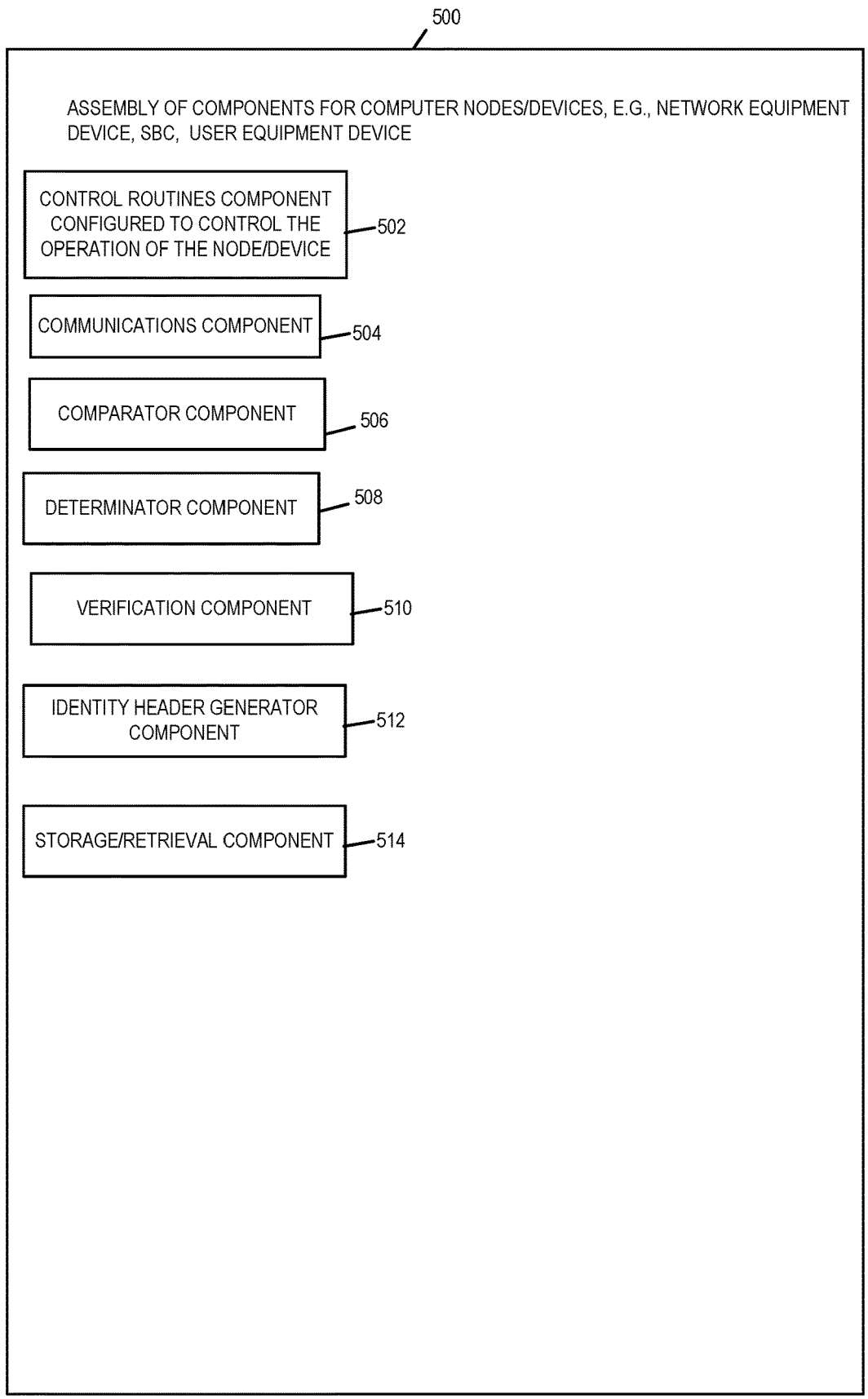
FIG. 5 illustrates an exemplary assembly of components in accordance with an embodiment of the present invention.

FIG. 5 as discussed above is a drawing illustrating an assembly of components 500 which may be included in an exemplary computing device/node 400 of FIG. 1 or 2 implemented in accordance with exemplary embodiment computing device/node 400, e.g., network equipment device such as an SBC. Assembly of components 500 may be, and in some embodiments is, used in computing device/node 400. The components in the assembly of components 500 can, and in some embodiments are, implemented fully in hardware within the processor 406, e.g., as individual circuits. The components in the assembly of components 500 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the computing device/node 400, with the components controlling operation of computing device/node 400 to implement the functions corresponding to the components when the components are executed by a processor, e.g., processor 406. In some such embodiments, the assembly of components 500 is included in the memory 410 as assembly of components 418. In still other embodiments, various components in assembly of components 500 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers.

When implemented in software the components include code, which when executed by the processor 406, configure the processor 406 to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the computing device/node 400 or elements therein such as the processor 406, to perform the functions of corresponding steps illustrated and/or described in the methods of flowchart/signaling diagram of FIG. 3 and/or described with respect to any of the Figures of an embodiment of the present invention. Thus the assembly of components 500 includes various components that perform functions of corresponding steps of FIG. 3 and the steps discussed in connection with FIGS. 6 and 7.

Assembly of components 500 includes components 502, 504, 506, 508, 510, 512 and 514. The control routines component 502 is configured to control the operation of the node or device. The communications component 504 is configured to provide communications functionality including communications signaling and support for various communications protocols and interfaces including SIP protocol support and the Shaken/Stir Protocol procedures. The communications component 504 handles all communications functionality including the generation, modification, updating, transmission, and reception of SIP messages, e.g., SIP INVITE request messages. The comparator component 506 compares values including SIP messages and/or portions of SIP messages such as SIP address information, SDP message information to matching criteria. The determinator component 508 makes determinations for the computing device/node such as for example determining whether to forward a received diverted call to another entity, e.g., SBC, determining whether to retrieve Identity header information for a received diverted SIP INVITE message from a shared storage device, determining whether to request Identity header information for a received diverted call from another entity, e.g., SBC, determining whether to generate an Identity header from information contained in a SIP header of a received diverted SIP INVITE message, determining whether a received SIP INVITE message is a diverted SIP INVITE message, e.g., from header information included in the received SIP INVITE message. The verification component 510 verifies Identity "shaken" and "stir" headers. In some embodiments, the verification component 510 is a sub-component of the communications component 504. Identity header generator component 512 is configured to generate Identity headers, e.g., for diverted SIP INVITE messages which do not include Identity headers, from information contained in the received SIP INVITE message or from information, e.g., an original Identity header of SIP INVITE before being diverted or from attestation level information, obtained from a storage device. In some embodiments the Identity header generator component 512 is a sub-component of the communications component 504 Storage/Retrieval component 514 is configured to store and retrieve information, e.g., Identify header information and call and/or session identification information, records, context records, in a storage device, e.g., a shared storage device or database. User Equipment and IP-PBX devices may only implement some of the components such as for example, the control routines component 502 and the communications component 504.

Various exemplary embodiments will now be discussed.

First Set of Numbered Exemplary Method Embodiments

Method Embodiment 1. A communications method comprising: receiving, at a first Session Border Controller (SBC), a diverted Session Initiation Protocol (SIP) INVITE message corresponding to a first call, said diverted SIP INVITE message not including an Identity header; obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC; and generating an Identity header based on the original Identity header or information from the original identity header (e.g., attestation level) corresponding to the first call obtained using said one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC.

Method Embodiment 2. The communications method of Method Embodiment 1, wherein said information included in the diverted SIP INVITE message includes information which identifies a record in which the original Identity header or said information from the original Identity header is stored.

Method Embodiment 2A. The communications method of Method Embodiment 2, wherein said record is a call context record including a copy of the original Identity header or said information from the original Identity header.

Method Embodiment 2B. The communications method of Method Embodiment 2, wherein said information from the original Identity header is an attestation level.

Method Embodiment 3. The communications method of Method Embodiment 2, wherein said information which identifies a record in which the original Identity header or said information from the original Identity header is stored includes one or more of the following: (i) a record identifier and (ii) call identification information.

Method Embodiment 3A. The communications method of Method Embodiment 3, wherein said information which identifies a record in which the original Identity header or said information from the original Identity header is stored is a record identifier, said record identifier being encrypted and included in a proprietary header, proprietary parameter or proprietary tag of the diverted SIP INVITE message.

Method Embodiment 4. The communications method of Method Embodiment 2, wherein said record further includes one or more of the following: (i) a record identifier or (ii) call identification information that identifies the record as including information for the first call.

Method Embodiment 5. The communications method of Method Embodiment 4, wherein said call identification information that identifies the record as including information for the first call includes one or more of the following: (i) an SBC trunk group identifier for an SBC trunk group at the first SBC, (ii) a source Internet Protocol (IP) address transport protocol port of the first SBC, and (iii) a SBC IP address and UDP port number of a second SBC.

Method Embodiment 6. The communications method of Method Embodiment 1 further comprising: receiving, at a second Session Border Controller, a SIP INVITE message corresponding to the first call including the original Identity header prior to receiving at the first SBC the diverted SIP INVITE message; storing, by the second Session Border Controller, the original Identity header or said information from the original Identity header (e.g., attestation level) in a record (e.g., a call context record) at the second Session Border Controller, a separate storage device (e.g., shared database), or at both the second Session Border Controller and a separate storage device, said separate storage device being accessible to both the second Session Border Controller and the first Session Border Controller.

Method Embodiment 6A. The communications method of Method Embodiment 6, wherein said first session border controller and said second session border controller are different session border controllers.

Method Embodiment 7. The communications method of Method Embodiment 1, wherein said step of obtaining an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: said first SBC using information included in the diverted SIP INVITE message to retrieve the original Identity header or information from the original Identity header from a record stored in a storage device, said information included in the diverted SIP INVITE message including: a record identifier included in a proprietary header, proprietary header parameter or proprietary header tag of the diverted SIP INVITE message.

Method Embodiment 7A. The communications method of Method Embodiment 7, wherein the record identifier is included in a proprietary parameter of a From header included in the diverted SIP INVITE message.

Method Embodiment 8. The communications method of Method Embodiment 1, wherein said step of obtaining an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: said first SBC using information included in the diverted SIP INVITE message to obtain the original Identity header or information from the original Identity header; and wherein said information included in the diverted SIP INVITE message includes one or more of the following: the original identity header or an attestation level corresponding to the first call included in a proprietary header, a proprietary header parameter, or a proprietary header tag of the diverted SIP INVITE message.

Method Embodiment 9. The communications method of Method Embodiment 8, wherein the original Identity header or the attestation level corresponding to the first call is included in a proprietary parameter of a From header included in the diverted SIP INVITE message; and wherein the original Identity header or the attestation level corresponding to the first call is encrypted using a shared key known to the first Session Border Controller.

Method Embodiment 10. The communications method of Method Embodiment 9 further comprising: prior to receiving the diverted SIP INVITE message at the first Session Border Controller performing the steps of: encrypting, at a second Session Border Controller, the original Identity header or the attestation level corresponding to the first call; placing the encrypted original Identity header or the attestation level corresponding to the first call in a proprietary parameter of a From header of a SIP INVITE message which is communicated to an endpoint device (e.g., IP-PBX) from the second Session Border Controller.

Method Embodiment 10A. The communication method of Method Embodiment 10, wherein said first and said second Session Border Controllers are the same Session Border Controller.

Method Embodiment 11. The communications method of Method Embodiment 3, wherein said call identification information: an SBC IP address and UDP port number for a media session for the first call; and wherein said SBC IP address and UDP port number for the media session for the first call is also included in a SDP body of the SDP message included in the diverted SIP INVITE message.

Method Embodiment 12. The communications method of Method Embodiment 1 further comprising: receiving, at a second Session Border Controller, a SIP INVITE message corresponding to the first call including the original Identity header prior to receiving at the first SBC the diverted SIP INVITE message; storing, by the second Session Border Controller, the original Identity header in a call context record at the second Session Border Controller; and communicating from said first Session Border Controller to said second Session Border Controller said diverted SIP INVITE message; and wherein said first and said second Session Border Controllers are different Session Border Controllers; wherein said step of obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: the second Session Border Controller identifying said call context record in which the original Identity header is stored using one or more of: (i) said information included in the diverted SIP INVITE message, and (ii) said information included in a Session Description Protocol message included in the diverted SIP INVITE message, and wherein said step of generating an Identity header based on the original Identity header or information form the original Identity header corresponding to the first call is performed by said second Session Border Controller.

Method Embodiment 13. The communications method of Method Embodiment 1 further comprising: receiving, at the first Session Border Controller, a SIP INVITE message corresponding to the first call including the original Identity header prior to receiving at the first SBC the diverted SIP INVITE message; and storing, by the first Session Border Controller, the original Identity header in a call context record at the first Session Border Controller or in a call context record at a storage device, or in a call context record at the first Session Border Controller and a copy of the call context record at a separate storage device.

Method Embodiment 14. The communications method of Method Embodiment 13, wherein said call context record includes an IP address and media port address assigned to the first Session Border Controller and included in the Session Description Protocol message of the diverted SIP INVITE message.

Method Embodiment 15. The communications method of Method Embodiment 1 further comprising: receiving, at a second Session Border Controller, a SIP INVITE message corresponding to the first call including the original Identity header prior to receiving at the first SBC the diverted SIP INVITE message; and storing, by the first Session Border Controller, the original Identity header in a call context record at the second Session Border Controller or in a call context record at a storage device, or in a call context record at the second Session Border Controller and a copy of the call context record at a separate storage device.

Method Embodiment 16. The communications method of Method Embodiment 15, wherein said call context record includes an IP address and media port address assigned to the second Session Border Controller and included in the Session Description Protocol message of the diverted SIP INVITE message.

Method Embodiment 17. The communications method of Method Embodiment 1, wherein said information included in the diverted SIP INVITE message includes one or more of the following: the original identity header or an attestation level corresponding to the first call included in a proprietary header or a proprietary header parameter of the diverted SIP INVITE message.

Method Embodiment 18. The communications method of Method Embodiment 1, further comprising: performing the step of obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC in response to determining the received diverted SIP INVITE is a diverted call message based on a SIP diversion header or a SIP history-info header included in the received diverted SIP INVITE message.

Second Set of Numbered Exemplary Method Embodiments

Method Embodiment 1. A communications method comprising: receiving, at a first Session Border Controller, a diverted SIP INVITE message corresponding to a first call, said diverted SIP INVITE message not including an Identity header; obtaining an original Identity header corresponding to the first call from a storage device using information included in a Session Description Protocol message included in the diverted SIP INVITE message; generating an Identity header based on the original Identity header obtained from the storage device corresponding to the first call.

Method Embodiment 2. The communications method of Method Embodiment 1 further comprising: receiving, at a second Session Border Controller, a SIP INVITE message corresponding to the first call including the original Identity header prior to receiving at the first SBC the diverted SIP INVITE message; storing, by the second Session Border Controller, the original Identity header in a call context record at the second Session Border Controller; and communicating from said first Session Border Controller to said second Session Border Controller said diverted SIP INVITE message; and wherein said first and said second Session Border Controllers are different Session Border Controllers; wherein said step of obtaining an original Identity header corresponding to the first call from a storage device using information included in a Session Description Protocol message included in the diverted SIP INVITE message is performed by said second Session Border Controller; and wherein said step of generating an Identity header based on the original Identity header obtained from the storage device corresponding to the first call is performed by said second Session Border Controller.

Method Embodiment 3. The communications method of Method Embodiment 1 further comprising: receiving, at the first Session Border Controller, a SIP INVITE message corresponding to the first call including the original Identity header prior to receiving at the first SBC the diverted SIP INVITE message; and storing, by the first Session Border Controller, the original Identity header in a call context record at the first Session Border Controller.

Method Embodiment 4. The communications method of Method Embodiment 2, wherein said call context record includes an IP address and media port address assigned to the second Session Border Controller and included in the Session Description Protocol message of the diverted SIP INVITE message.

Method Embodiment 5. The communications method of Method Embodiment 3, wherein said call context record includes an IP address and media port address assigned to the first Session Border Controller and included in the Session Description Protocol message of the diverted SIP INVITE message.

Method Embodiment 6. A communications method comprising: receiving, at a first Session Border Controller from an end point device, a diverted SIP INVITE message corresponding to a first call, said diverted SIP INVITE message not including an Identity header; obtaining an original Identity header or an attestation level corresponding to the first call from a proprietary header or a proprietary header parameter of the diverted SIP INVITE message; generating an Identity header based on the original Identity header or the attestation level corresponding to the first call obtained from the from the proprietary header or the proprietary header parameter of the diverted SIP INVITE message.

Method Embodiment 7. The communications method of Method Embodiment 6, wherein the original Identity header or an attestation level corresponding to the first call is included in a proprietary parameter of a From header included in the diverted SIP INVITE message; and wherein the original Identity header or the attestation level corresponding to the first call is encrypted using a shared key known to the first Session Border Controller.

Method Embodiment 8. The communications method of Method Embodiment 7 further comprising: prior to receiving the diverted SIP message at the first Session Border Controller performing the steps of: encrypting, at a second Session Border Controller, the original Identity header or the attestation level corresponding to the first call; placing the encrypted original Identity header or the attestation level corresponding to the first call in a proprietary parameter of a From header of a SIP INVITE message which is communicated to the endpoint device (e.g., IP-PBX) from the second Session Border Controller.

Method Embodiment 9. The communications method of Method Embodiment 8, wherein said first and said second Session Border Controllers are the same Session Border Controller.

First Set of Numbered Exemplary System Embodiments

System Embodiment 1. A communications system comprising: a first Session Border Controller (SBC) including: memory; one or more Input/Output Interfaces; and a first processor, said first processor controlling the first SBC to perform the following operations: receiving, at the first Session Border Controller, a diverted Session Initiation Protocol (SIP) INVITE message corresponding to a first call, said diverted SIP INVITE message not including an Identity header; obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC; and generate an Identity header based on the original Identity header or information from the original identity header (e.g., attestation level) corresponding to the first call obtained using said one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC.

System Embodiment 2. The communications system of System Embodiment 1, wherein said information included in the diverted SIP INVITE message includes information which identifies a record in which the original Identity header or said information from the original Identity header is stored.

System Embodiment 2A. The communications system of System Embodiment 2, wherein said record is a call context record including a copy of the original Identity header or said information from the original Identity header.

System Embodiment 2B. The communications system of System Embodiment 2, wherein said information from the original Identity header is an attestation level.

System Embodiment 3. The communications system of System Embodiment 2, wherein said information which identifies a record in which the original Identity header or said information from the original Identity header is stored includes one or more of the following: (i) a record identifier and (ii) call identification information.

System Embodiment 3A. The communications system of System Embodiment 3, wherein said information which identifies a record in which the original Identity header or said information from the original Identity header is stored is a record identifier, said record identifier being encrypted and included in a proprietary header, proprietary parameter or proprietary tag of the diverted SIP INVITE message.

System Embodiment 4. The communications system of System Embodiment 2, wherein said record further includes one or more of the following: (i) a record identifier or (ii) call identification information that identifies the record as including information for the first call.

System Embodiment 5. The communications system of System Embodiment 4, wherein said call identification information that identifies the record as including information for the first call includes one or more of the following: (i) an SBC trunk group identifier for an SBC trunk group at the first SBC, (ii) a source Internet Protocol (IP) address transport protocol port of the first SBC, and (iii) a SBC IP address and UDP port number of a second SBC.

System Embodiment 6. The communications system of System Embodiment 1 further comprising: a second Session Border Controller including: memory; one or more Input/Output Interfaces; a second processor, said second processor controlling the second SBC to perform the following operations: receive, at the second Session Border Controller, a SIP INVITE message corresponding to the first call including the original Identity header prior to receiving at the first SBC the diverted SIP INVITE message; and store, by the second Session Border Controller, the original Identity header or said information from the original Identity header (e.g., attestation level) in a record (e.g., a call context record) at the second Session Border Controller, a separate storage device (e.g., shared database), or at both the second Session Border Controller and a separate storage device, said separate storage device being accessible to both the second Session Border Controller and the first Session Border Controller.

System Embodiment 6A. The communications system of System Embodiment 6, wherein said first session border controller and said second session border controller are different session border controllers.

System Embodiment 7. The communications system of System Embodiment 1, wherein said operation to obtain an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: said first SBC using information included in the diverted SIP INVITE message to retrieve the original Identity header or information from the original Identity header from a record stored in a storage device, said information included in the diverted SIP INVITE message including: a record identifier included in a proprietary header, proprietary header parameter or proprietary header tag of the diverted SIP INVITE message.

System Embodiment 7A. The communications system of System Embodiment 7, wherein the record identifier is included in a proprietary parameter of a From header included in the diverted SIP INVITE message.

System Embodiment 8. The communications system of System Embodiment 1, wherein said step of obtaining an original Identity header or information from the original Identity header corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC includes: said first SBC using information included in the diverted SIP INVITE message to obtain the original Identity header or information from the original Identity header; and wherein said information included in the diverted SIP INVITE message includes one or more of the following: the original identity header or an attestation level corresponding to the first call included in a proprietary header, a proprietary header parameter, or a proprietary header tag of the diverted SIP INVITE message.

System Embodiment 9. The communications system of System Embodiment 8, wherein the original Identity header or the attestation level corresponding to the first call is included in a proprietary parameter of a From header included in the diverted SIP INVITE message; and wherein the original Identity header or the attestation level corresponding to the first call is encrypted using a shared key known to the first Session Border Controller.

System Embodiment 10. The communications system of System Embodiment 9 further comprising: a second SBC, said second SBC including a second processor which controls the second SBC to perform the following operations prior to the diverted SIP INVITE message being received at the first Session Border Controller: encrypting, at a second Session Border Controller, the original Identity header or the attestation level corresponding to the first call; placing the encrypted original Identity header or the attestation level corresponding to the first call in a proprietary parameter of a From header of a SIP INVITE message which is communicated to an endpoint device (e.g., IP-PBX) from the second Session Border Controller.

System Embodiment 11. The communications system of System Embodiment 3, wherein said call identification information includes: an SBC IP address and UDP port number for a media session for the first call; and wherein said SBC IP address and UDP port number for the media session for the first call is also included in a SDP body of the SDP message included in the diverted SIP INVITE message.

System Embodiment 12. The communications system of System Embodiment 1, further comprising: a second SBC including a second processor and memory, said second processor controlling the second SBC to perform the following operations: receive, at the second Session Border Controller, a SIP INVITE message corresponding to the first call including the original Identity header prior to receiving at the first SBC the diverted SIP INVITE message; store, by the second Session Border Controller, the original Identity header in a call context record at the second Session Border Controller; and receive from said first Session Border Controller at said second Session Border Controller a request for the stored original Identity header, said request for the stored original Identity header including information from which the call context record can be identified; retrieve by the second SBC the stored original Identity header from the call context record using said information included in the request; communicate, from the second SBC to the first SBC, the retrieved original identity header.

System Embodiment 13. The communications system of System Embodiment 1, wherein said first processor further controls the first Session Border Controller to perform the following operations: receive, at the first Session Border Controller, a SIP INVITE message corresponding to the first call including the original Identity header prior to receiving at the first SBC the diverted SIP INVITE message; and store, by the first Session Border Controller, the original Identity header in a call context record at the first Session Border Controller or in a call context record at a storage device, or in both a call context record at the first Session Border Controller and a copy of the call context record at a separate storage device.

System Embodiment 14. The communications system of System Embodiment 13, wherein said call context record includes an IP address and media port address assigned to the first Session Border Controller and included in the Session Description Protocol message of the diverted SIP INVITE message.

System Embodiment 15. The communications system of System Embodiment 1 further comprising: a second Session Border Controller, said second Session Border Controller including a processor that controls the second Session Border Controller to perform the following operations: receive, at a second Session Border Controller, a SIP INVITE message corresponding to the first call including the original Identity header prior to receiving at the first SBC the diverted SIP INVITE message; and store, by the first Session Border Controller, the original Identity header in a call context record at the second Session Border Controller or in a call context record at a storage device, or in a call context record at the second Session Border Controller and a copy of the call context record at a separate storage device.

System Embodiment 16. The communications system of System Embodiment 15, wherein said call context record includes an IP address and media port address assigned to the second Session Border Controller and included in the Session Description Protocol message of the diverted SIP INVITE message.

System Embodiment 17. The communications system of System Embodiment 1, wherein said information included in the diverted SIP INVITE message includes one or more of the following: the original identity header or an attestation level corresponding to the first call included in a proprietary header or a proprietary header parameter of the diverted SIP INVITE message.

System Embodiment 18. The communications system of System Embodiment 1, wherein said first processor further controls the first SBC to: perform the operation of obtaining an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC in response to determining by the first SBC that the received diverted SIP INVITE is a diverted call message based on a SIP diversion header or a SIP history-info header included in the received diverted SIP INVITE message.

Second Set of Numbered Exemplary System Embodiments

System Embodiment 1. A communications system comprising: a first Session Border Controller (SBC), said first SBC including a first processor that controls the first SBC to perform the following operations: receive, at the first Session Border Controller, a diverted SIP INVITE message corresponding to a first call, said diverted SIP INVITE message not including an Identity header; obtain an original Identity header corresponding to the first call from a storage device using information included in a Session Description Protocol message included in the diverted SIP INVITE message; generate an Identity header based on the original Identity header obtained from the storage device corresponding to the first call.

System Embodiment 2. The communications system of System Embodiment 1 further comprising: a second Session Border Controller, the second Session Border Controller including: memory; a second processor that controls the second Session Border Controller to perform the following operations: receive, at a second Session Border Controller, a SIP INVITE message corresponding to the first call including the original Identity header prior to receiving at the first SBC the diverted SIP INVITE message; store, by the second Session Border Controller, the original Identity header in a call context record in the memory of the second Session Border Controller; and receive from said first Session Border Controller to said second Session Border Controller a request for the stored original Identity header, said request including information from which the call context record in which the original Identity header is stored can be identified; and wherein said operation of obtaining an original Identity header corresponding to the first call from a storage device using information included in a Session Description Protocol message included in the diverted SIP INVITE message includes generating said request and communicating said request to the second SBC; and wherein said second SBC is said storage device.

System Embodiment 3. The communications system of System Embodiment 1, wherein said first processor further controls the first SBC to perform the following operations: receive, at the first Session Border Controller, a SIP INVITE message corresponding to the first call including the original Identity header prior to receiving at the first SBC the diverted SIP INVITE message; and store, by the first Session Border Controller, the original Identity header in a call context record at the first Session Border Controller.

System Embodiment 4. The communications system of System Embodiment 2, wherein said call context record includes an IP address and media port address assigned to the second Session Border Controller and included in the Session Description Protocol message of the diverted SIP INVITE message.

System Embodiment 5. The communications system of System Embodiment 3, wherein said call context record includes an IP address and media port address assigned to the first Session Border Controller and included in the Session Description Protocol message of the diverted SIP INVITE message.

System Embodiment 6. A communications system comprising: a first Session Border Controller including a first processor, said first processor controlling the first Session Border Controller to perform the following operations: receive, at a first Session Border Controller from an end point device, a diverted SIP INVITE message corresponding to a first call, said diverted SIP INVITE message not including an Identity header; obtain an original Identity header or an attestation level corresponding to the first call from a proprietary header or a proprietary header parameter of the diverted SIP INVITE message; and generate an Identity header based on the original Identity header or the attestation level corresponding to the first call obtained from the from the proprietary header or the proprietary header parameter of the diverted SIP INVITE message.

System Embodiment 7. The communications system of System Embodiment 6, wherein the original Identity header or an attestation level corresponding to the first call is included in a proprietary parameter of a From header included in the diverted SIP INVITE message; and wherein the original Identity header or the attestation level corresponding to the first call is encrypted using a shared key known to the first Session Border Controller.

System Embodiment 8. The communications system of System Embodiment 7 further comprising: a second Session Border Controller, said second Session Border Controller including a second processor that controls the second Session Border Controller to perform the following operations prior to first Session Border Controller receiving the diverted SIP message: encrypt, at a second Session Border Controller, the original Identity header or the attestation level corresponding to the first call; place the encrypted original Identity header or the attestation level corresponding to the first call in a proprietary parameter of a From header of a SIP INVITE message which is communicated to the endpoint device (e.g., IP-PBX) from the second Session Border Controller.

First Set of Numbered Exemplary Non-Transitory Machine Readable Medium Embodiments Non-transitory Machine Readable Embodiment 1. A non-transitory machine readable medium including processor executable instructions, which when executed by a processor of a first Session Border Controller (SBC) controls the first SBC to: receive, at the first Session Border Controller, a diverted Session Initiation Protocol (SIP) INVITE message corresponding to a first call, said diverted SIP INVITE message not including an Identity header; obtain an original Identity header or information from the original Identity header (e.g., attestation level) corresponding to the first call using one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC; and generate an Identity header based on the original Identity header or information from the original identity header (e.g., attestation level) corresponding to the first call obtained using said one or more of the following: (i) information included in the diverted SIP INVITE message, (ii) information included in a Session Description Protocol message included in the diverted SIP INVITE message, (iii) an SBC trunk group on which the diverted SIP INVITE message was received at the first SBC, or (iv) a source Internet Protocol (IP) address transport protocol port of an IP packet carrying the diverted SIP Invite message received at the first SBC.

Non-transitory Machine Readable Embodiment 2. The non-transitory machine readable medium of Non-transitory Machine Readable Embodiment 1, wherein said information included in the diverted SIP INVITE message includes information which identifies a record in which the original Identity header or said information from the original Identity header is stored.

Non-transitory Machine Readable Embodiment 2A. The non-transitory machine readable medium of Non-transitory Machine Readable Embodiment 2, wherein said record is a call context record including a copy of the original Identity header or said information from the original Identity header.

Non-transitory Machine Readable Embodiment 2B. The non-transitory machine readable medium of Non-transitory Machine Readable Embodiment 2, wherein said information from the original Identity header is an attestation level.

Non-transitory Machine Readable Embodiment 3. The non-transitory machine readable medium of Non-transitory Machine Readable Embodiment 2, wherein said information which identifies a record in which the original Identity header or said information from the original Identity header is stored includes one or more of the following: (i) a record identifier and (ii) call identification information.

Non-transitory Machine Readable Embodiment 3A. The non-transitory machine readable medium of Non-transitory Machine Readable Embodiment 3, wherein said information which identifies a record in which the original Identity header or said information from the original Identity header is stored is a record identifier, said record identifier being encrypted and included in a proprietary header, proprietary parameter or proprietary tag of the diverted SIP INVITE message.

The techniques of various embodiments may be implemented using software, hardware and/or a combination of software and hardware. Various embodiments are directed to apparatus, e.g., session border controllers, network nodes, network equipment devices, storage devices, endpoint devices, user equipment devices, IP-PBXes. Various embodiments are also directed to methods, e.g., method of controlling and/or operating devices such as session border controllers, network nodes, network equipment devices, storage devices, endpoint devices, user equipment devices, IP-PBXes. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controllers, network nodes, network equipment devices, endpoint devices, user equipment devices, IP-PBXes, storage devices, including a processor configured to implement one, multiple or all of the steps of one or more methods of the invention.

In some embodiments, the processor or processors, e.g., CPUs, of one or more devices, e.g., computing nodes such as session border controllers, network nodes, network equipment devices, endpoint devices, user equipment devices, IP-PBXes, storage devices are configured to perform the steps of the methods described as being performed by the computing nodes, e.g., session border controllers, network nodes, network equipment devices, endpoint devices, user equipment devices, IP-PBXes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as sensors, call processing devices, gateways, session border controllers, network nodes and/or network equipment devices with a processor which includes a component corresponding to each of the steps of the various described methods performed by the device in which the processor is included. In some but not all embodiments a device, e.g., computing node such session border controllers, network nodes, network equipment devices, endpoint devices, user equipment devices, IP-PBXes, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a network equipment device, session border controller or other device described in the present application.

Numerous additional variations on the methods and apparatus of the various embodiments described above will be apparent to those skilled in the art in view of the above description. Such variations are to be considered within the scope of the invention. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
receiving, at a first Session Border Controller (SBC), a diverted Session Initiation Protocol (SIP) INVITE message corresponding to a first call, said diverted SIP INVITE message not including an Identity header;
obtaining an original Identity header or information from the original Identity header corresponding to the first call using one or more of the following: (i) information included in the diverted SIP INVITE message, (ii) information included in a Session Description Protocol (SDP) message included in the diverted SIP INVITE message, (iii) a SBC trunk group on which the diverted SIP INVITE message was received at the first SBC, or (iv) a source Internet Protocol (IP) address transport protocol port of an IP packet carrying the diverted SIP INVITE message received at the first SBC; and
generating an Identity header based on the original Identity header or information from the original Identity header corresponding to the first call obtained using said one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC;
receiving, at a second SBC, a SIP INVITE message corresponding to the first call including the original Identity header prior to receiving at the first SBC the diverted SIP INVITE message; and storing, by the second SBC prior to receiving at the first SBC the diverted SIP INVITE message, the original Identity header or said information from the original Identity header in a record at the second SBC, a separate storage device, or at both the second SBC and a separate storage device, said separate storage device being accessible to both the second SBC and the first SBC.

2. The communications method of claim 1, wherein said information included in the diverted SIP INVITE message includes information which identifies a record in which the original Identity header or said information from the original Identity header is stored.

3. The communications method of claim 2, wherein said information which identifies a record in which the original Identity header or said information from the original Identity header is stored includes one or more of the following: (i) a record identifier and (ii) call identification information.

4. The communications method of claim 2, wherein said record further includes one or more of the following: (i) a record identifier or (ii) call identification information that identifies the record as including information for the first call.

5. The communications method of claim 4, wherein said call identification information that identifies the record as including information for the first call includes one or more of the following: (i) a SBC trunk group identifier for an SBC trunk group at the first SBC, (ii) a source IP address transport protocol port of the first SBC, and (iii) a SBC IP address and User Datagram Protocol (UDP) port number of a second SBC.

6. The communications method of claim 1, wherein said step of obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC includes:

using, by said first SBC, information included in the diverted SIP INVITE message to retrieve the original Identity header or information from the original Identity header from a record stored in a storage device, said information included in the diverted SIP INVITE message including: a record identifier included in a proprietary header, a proprietary header parameter or a proprietary header tag of the diverted SIP INVITE message.

7. The communications method of claim 1, wherein said step of obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC includes:

using, by said first SBC, information included in the diverted SIP INVITE message to obtain the original Identity header or information from the original Identity header; and wherein said information included in the diverted SIP INVITE message includes one or more of the following: the original Identity header or an attestation level corresponding to the first call included in a proprietary header, a proprietary header parameter, or a proprietary header tag of the diverted SIP INVITE message.

8. The communications method of claim 3,
wherein said call identification information includes: an SBC IP address and User Datagram Protocol (UDP) port number for a media session for the first call; and
wherein said SBC IP address and UDP port number for the media session for the first call is also included in a SDP body of the SDP message included in the diverted SIP INVITE message.

9. The communications method of claim 1,
wherein said Identity header, said original Identity header, and said generated Identity header are SIP Identity headers including a Secure Handling of Asserted information using toKENs (SHAKEN) Personal Assertion Token (PASSporT).

10. The communications method of claim 1,
wherein said generated Identity header is generated based on information contained in the original Identity header, said information contained in the original Identity header being attestation information.

11. The communications method of claim 1,
wherein said original Identity header is a SIP Identity header which includes: calling party information, called party information, and attestation information; and
wherein at least some of the information included in the SIP Identity header has been digitally signed or encrypted.

12. The communications method of claim 1,
wherein said original Identity header is a SIP Identity header including:
(i) an originating identity for the first call, and
(ii) an attestation level, said attestation level indicating a specific level of confidence in the correctness of the originating identity of the first call; and
wherein said generated Identity header includes the same originating identity for the first call and the same attestation level which is included in the original Identity header.

13. The communications method of 12: The communications method of wherein said attestation level included in the original Identity header is full attestation.

14. The communications method of claim 1,
wherein said first and said second SBCs are the same SBC.

15. A communications method comprising:
receiving, at a first Session Border Controller (SBC), a diverted Session Initiation Protocol (SIP) INVITE message corresponding to a first call, said diverted SIP INVITE message not including an Identity header;
obtaining an original Identity header or information from the original Identity header corresponding to the first call using one or more of the following: (i) information included in the diverted SIP INVITE message, (ii) information included in a Session Description Protocol (SDP) message included in the diverted SIP INVITE message, (iii) a SBC trunk group on which the diverted SIP INVITE message was received at the first SBC, or (iv) a source Internet Protocol (IP) address transport protocol port of an IP packet carrying the diverted SIP INVITE message received at the first SBC; and generating an Identity header based on the original Identity header or information from the original Identity header corresponding to the first call obtained using said one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC;

wherein said step of obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC includes:

said first SBC using information included in the diverted SIP INVITE message to obtain the original Identity header or information from the original Identity header;

wherein said information included in the diverted SIP INVITE message includes one or more of the following: the original Identity header or an attestation level corresponding to the first call included in a proprietary header, a proprietary header parameter, or a proprietary header tag of the diverted SIP INVITE message;

wherein the original Identity header or the attestation level corresponding to the first call is included in a proprietary parameter of a From header included in the diverted SIP INVITE message; and wherein the original Identity header or the attestation level corresponding to the first call is encrypted using a shared key known to the first SBC.

16. The communications method of claim 15 further comprising:

prior to receiving the diverted SIP INVITE message at the first SBC performing the steps of:

encrypting, at a second SBC, the original Identity header or the attestation level corresponding to the first call; and placing the encrypted original Identity header or the attestation level corresponding to the first call in a proprietary parameter of a From header of a SIP INVITE message which is communicated to an endpoint device from the second SBC.

17. A communications system comprising:

a first Session Border Controller (SBC) including:
memory;
one or more Input/Output Interfaces; and
a first processor, said first processor controlling the first SBC to perform the following operations:
receiving, at the first SBC, a diverted Session Initiation Protocol (SIP) INVITE message corresponding to a first call, said diverted SIP INVITE message not including an Identity header;
obtaining an original Identity header or information from the original Identity header corresponding to the first call using one or more of the following: (i) information included in the diverted SIP INVITE message, (ii) information included in a Session Description Protocol (SDP) message included in the diverted SIP INVITE message, (iii) a SBC trunk group on which the diverted SIP INVITE message was received at the first SBC, or (iv) a source Internet Protocol (IP) address transport protocol port of an IP packet carrying the diverted SIP INVITE message received at the first SBC; and generating an Identity header based on the original Identity header or information from the original Identity header corresponding to the first call obtained using said one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC;

a second SBC including:
memory;
one or more Input/Output Interfaces;
a second processor, said second processor controlling the second SBC to perform the following operations:
receiving, at the second SBC, a SIP INVITE message corresponding to the first call including the original Identity header prior to receiving at the first SBC the diverted SIP INVITE message; and
storing, by the second SBC prior to receiving at the first SBC the diverted SIP INVITE message, the original Identity header or said information from the original Identity header in a record at the second SBC, a separate storage device, or at both the second SBC and a separate storage device, said separate storage device being accessible to both the second SBC and the first SBC.

18. The communications system of claim 17, wherein said information included in the diverted SIP INVITE message includes information which identifies a record in which the original Identity header or said information from the original Identity header is stored.

19. The communications system of claim 18, wherein said information which identifies a record in which the original Identity header or said information from the original Identity header is stored includes one or more of the following: (i) a record identifier and (ii) call identification information.

20. The communications system of claim 18, wherein said record further includes one or more of the following: (i) a record identifier or (ii) call identification information that identifies the record as including information for the first call.

21. The communications system of claim 20, wherein said call identification information that identifies the record as including information for the first call includes one or more of the following: (i) a SBC trunk group identifier for an SBC trunk group at the first SBC, (ii) a source IP address transport protocol port of the first SBC, and (iii) a SBC IP address and UDP port number of a second SBC.

22. The communications system of claim 17, wherein said operation of obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC includes:

using, by said first SBC, information included in the diverted SIP INVITE message to retrieve the original Identity header or information from the original Identity header from a record stored in a storage device, said information included in the diverted SIP INVITE message including: a record identifier included in a proprietary header, a proprietary header parameter or a proprietary header tag of the diverted SIP INVITE message.

23. The communications system of claim 17, wherein said operation of obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP Invite message received at the first SBC includes:

using, by the first SBC, information included in the diverted SIP INVITE message to obtain the original Identity header or information from the original Identity header; and wherein said information included in the diverted SIP INVITE message includes one or more of the following: the original Identity header or an attestation level corresponding to the first call included in a proprietary header, a proprietary header parameter, or a proprietary header tag of the diverted SIP INVITE message.

24. The communications system of claim 17, wherein said first and said second SBCs are the same SBC.

25. The communications system of claim 17, wherein said original Identity header is a SIP Identity header including:
(i) an originating identity for the first call, and
(ii) an attestation level, said attestation level indicating a specific level of confidence in the correctness of the originating identity of the first call; and
wherein said generated Identity header includes the same originating identity for the first call and the same attestation level which is included in the original Identity header; and
wherein said attestation level included in the original Identity header is full attestation.

26. A first non-transitory machine readable medium including processor executable instructions, which when executed by a processor of a first Session Border Controller (SBC) controls the first SBC to:

receive, at the first SBC, a diverted Session Initiation Protocol (SIP) INVITE message corresponding to a first call, said diverted SIP INVITE message not including an Identity header;

obtain an original Identity header or information from the original Identity header corresponding to the first call using one or more of the following: (i) information included in the diverted SIP INVITE message, (ii) information included in a Session Description Protocol (SDP) message included in the diverted SIP INVITE message, (iii) a SBC trunk group on which the diverted SIP INVITE message was received at the first SBC, or (iv) a source Internet Protocol (IP) address transport protocol port of an IP packet carrying the diverted SIP INVITE message received at the first SBC; and generate an Identity header based on the original Identity header or information from the original Identity header corresponding to the first call obtained using said one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC; and a second non-transitory machine readable medium including processor executable instructions, which when executed by a processor of a second SBC controls the second SBC to:

receive, at the second SBC, a SIP INVITE message corresponding to the first call including the original Identity header prior to receiving at the first SBC the diverted SIP INVITE message; and store, by the second SBC prior to receiving at the first SBC the diverted SIP INVITE message, the original Identity header or said information from the original Identity header in a record at the second SBC, a separate storage device, or at both the second SBC and a separate storage device, said separate storage device being accessible to both the second SBC and the first SBC.

27. A communications system comprising:
a first Session Border Controller (SBC) including:
memory;
one or more Input/Output Interfaces; and
a first processor, said first processor controlling the first SBC to perform the following operations:
receiving, at the first SBC, a diverted Session Initiation Protocol (SIP) INVITE message corresponding to a first call, said diverted SIP INVITE message not including an Identity header;
obtaining an original Identity header or information from the original Identity header corresponding to the first call using one or more of the following: (i) information included in the diverted SIP INVITE message, (ii) information included in a Session Description Protocol (SDP) message included in the diverted SIP INVITE message, (iii) a SBC trunk group on which the diverted SIP INVITE message was received at the first SBC, or (iv) a source Internet Protocol (IP) address transport protocol port of an IP packet carrying the diverted SIP INVITE message received at the first SBC; and
generating an Identity header based on the original Identity header or information from the original Identity header corresponding to the first call obtained using said one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC;
wherein said obtaining an original Identity header or information from the original Identity header corresponding to the first call using one or more of the following: (i) information included in the diverted SIP INVITE message, (ii) information included in a SDP message included in the diverted SIP INVITE message, (iii) a SBC trunk group on which the diverted SIP INVITE message was received at the first SBC, or (iv) a source IP address transport protocol port of an IP packet carrying the diverted SIP INVITE message received at the first SBC includes:

said first SBC using information included in the diverted SIP INVITE message to obtain the original Identity header or information from the original Identity header;

wherein said information included in the diverted SIP INVITE message includes one or more of the following: the original Identity header or an attestation level corresponding to the first call included in a proprietary header, a proprietary header parameter, or a proprietary header tag of the diverted SIP INVITE message;

wherein the original Identity header or the attestation level corresponding to the first call is included in a proprietary parameter of a From header included in the diverted SIP INVITE message; and wherein the original Identity header or the attestation level corresponding to the first call is encrypted using a shared key known to the first SBC.

* * * * *